US008086575B2

(12) United States Patent
Putterman et al.

(10) Patent No.: US 8,086,575 B2
(45) Date of Patent: Dec. 27, 2011

(54) METHODS AND APPARATUS FOR INTEGRATING DISPARATE MEDIA FORMATS IN A NETWORKED MEDIA SYSTEM

(75) Inventors: Daniel Putterman, San Francisco, CA (US); Brad Dietrich, San Francisco, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 253 days.

(21) Appl. No.: 10/949,775

(22) Filed: Sep. 23, 2004

(65) Prior Publication Data
US 2007/0220024 A1 Sep. 20, 2007

(51) Int. Cl.
*G06F 7/00* (2006.01)
(52) U.S. Cl. .......................... 707/693; 707/802; 710/29
(58) Field of Classification Search .................. None
See application file for complete search history.

(56) References Cited

U.S. PATENT DOCUMENTS

| | | | |
|---|---|---|---|
| 4,355,415 A | 10/1982 | George et al. |
| 4,488,179 A | 12/1984 | Kroger et al. |
| 4,602,279 A | 7/1986 | Freeman |
| 4,605,964 A | 8/1986 | Chard |
| 4,694,490 A | 9/1987 | Harvey et al. |
| 4,704,725 A | 11/1987 | Harvey et al. |
| 4,706,121 A | 11/1987 | Young |
| 4,718,107 A | 1/1988 | Hayes |
| 4,745,549 A | 5/1988 | Hashimoto |
| 4,751,578 A | 6/1988 | Reiter et al. |
| 4,787,063 A | 11/1988 | Muguet |
| 4,847,698 A | 7/1989 | Freeman |
| 4,857,999 A | 8/1989 | Welsh |
| 4,908,707 A | 3/1990 | Kinghorn |

(Continued)

FOREIGN PATENT DOCUMENTS

CA 2635571 5/2009

(Continued)

OTHER PUBLICATIONS

U.S. Appl. No. 09/332,244, filed Jun. 11, 1999, Ellis.

(Continued)

*Primary Examiner* — Tim T. Vo
*Assistant Examiner* — Hasanul Mobin
(74) *Attorney, Agent, or Firm* — Ropes & Gray LLP

(57) ABSTRACT

A media system includes at least a source media device and a playback media device coupled through a network. The source media device presents media to the network. The media comprises at least one digital content file with a first format. A playback media device plays back digital content files formatted in a second format. A transcoder, also coupled to the network, converts the first format of the digital content file to a second format. In one embodiment, the transcoder comprises a device separate from the source media device and the playback media device. In another embodiment, the transcoder comprises a device integrated with the source media device. The playback device receives the digital content file, formatted in the second format, over the network, and processes the digital content file in the second format to generate processed signals. The processed signals drive the playback device to play the digital content file. In another embodiment, the transcoder operates in conjunction with one or more media servers. For this embodiment, media, stored on the media servers, is converted to one or more different file formats. The conversion may occur without requiring a user to initiate the conversion.

33 Claims, 10 Drawing Sheets

U.S. PATENT DOCUMENTS

| | | | |
|---|---|---|---|
| 4,930,158 A | 5/1990 | Vogel | |
| 4,959,720 A | 9/1990 | Duffield et al. | |
| 4,963,994 A | 10/1990 | Levine | |
| 4,965,825 A | 10/1990 | Harvey et al. | |
| 4,977,455 A | 12/1990 | Young | |
| 5,027,400 A | 6/1991 | Baji et al. | |
| 5,047,867 A | 9/1991 | Strubbe et al. | |
| 5,109,279 A | 4/1992 | Ando | |
| 5,109,414 A | 4/1992 | Harvey et al. | |
| 5,134,719 A | 7/1992 | Mankovitz | |
| 5,151,789 A | 9/1992 | Young | |
| 5,155,591 A | 10/1992 | Wachob | |
| 5,172,413 A | 12/1992 | Bradley et al. | |
| 5,200,822 A | 4/1993 | Bronfin et al. | |
| 5,231,493 A | 7/1993 | Apitz | |
| 5,233,654 A | 8/1993 | Harvey et al. | |
| 5,253,066 A | 10/1993 | Vogel | |
| 5,335,277 A | 8/1994 | Harvey et al. | |
| 5,412,720 A | 5/1995 | Hoarty | |
| 5,442,389 A | 8/1995 | Blahut et al. | |
| 5,442,390 A | 8/1995 | Hooper et al. | |
| 5,453,779 A | 9/1995 | Dan et al. | |
| 5,461,415 A | 10/1995 | Wolf et al. | |
| 5,479,266 A | 12/1995 | Young et al. | |
| 5,479,268 A | 12/1995 | Young et al. | |
| 5,479,302 A | 12/1995 | Haines | |
| 5,485,197 A | 1/1996 | Hoarty | |
| 5,506,932 A * | 4/1996 | Holmes et al. | 704/205 |
| 5,517,254 A | 5/1996 | Monta et al. | |
| 5,517,257 A | 5/1996 | Dunn et al. | |
| 5,524,195 A | 6/1996 | Clanton, III et al. | |
| 5,528,513 A | 6/1996 | Vaitzblit et al. | |
| 5,534,911 A | 7/1996 | Levitan | |
| 5,539,449 A | 7/1996 | Blahut et al. | |
| 5,550,576 A | 8/1996 | Klosterman | |
| 5,557,724 A | 9/1996 | Sampat et al. | |
| 5,571,672 A | 11/1996 | Slavicek et al. | |
| 5,574,778 A | 11/1996 | Ely et al. | |
| 5,576,755 A | 11/1996 | Davis et al. | |
| 5,583,561 A | 12/1996 | Baker et al. | |
| 5,583,563 A | 12/1996 | Wanderscheid et al. | |
| 5,585,838 A | 12/1996 | Lawler et al. | |
| 5,585,858 A | 12/1996 | Harper et al. | |
| 5,585,866 A | 12/1996 | Miller et al. | |
| 5,586,264 A | 12/1996 | Belknap et al. | |
| 5,589,892 A | 12/1996 | Knee et al. | |
| 5,592,551 A | 1/1997 | Lett et al. | |
| 5,594,779 A | 1/1997 | Goodman | |
| 5,602,582 A | 2/1997 | Wanderscheid et al. | |
| 5,606,642 A | 2/1997 | Stautner et al. | |
| 5,610,653 A | 3/1997 | Abecassis | |
| 5,616,876 A | 4/1997 | Cluts | |
| 5,619,247 A | 4/1997 | Russo | |
| 5,619,249 A | 4/1997 | Billock et al. | |
| 5,619,274 A | 4/1997 | Roop et al. | |
| 5,623,613 A | 4/1997 | Rowe et al. | |
| 5,625,678 A | 4/1997 | Blomfield-Brown | |
| 5,629,867 A | 5/1997 | Goldman | |
| 5,630,060 A * | 5/1997 | Tang et al. | 709/238 |
| 5,630,119 A | 5/1997 | Aristides et al. | |
| 5,632,007 A | 5/1997 | Freeman | |
| 5,635,987 A | 6/1997 | Park et al. | |
| 5,648,824 A | 7/1997 | Dunn et al. | |
| 5,652,613 A | 7/1997 | Lazarus et al. | |
| 5,654,748 A | 8/1997 | Matthews et al. | |
| 5,654,886 A | 8/1997 | Zereski, Jr. et al. | |
| 5,657,072 A | 8/1997 | Aristides et al. | |
| 5,666,645 A | 9/1997 | Thomas et al. | |
| 5,671,377 A | 9/1997 | Bleidt et al. | |
| 5,675,743 A | 10/1997 | Mavity | |
| 5,684,525 A | 11/1997 | Klosterman | |
| 5,694,163 A | 12/1997 | Harrison | |
| 5,696,765 A | 12/1997 | Safadi | |
| 5,708,961 A | 1/1998 | Hylton et al. | |
| 5,710,601 A | 1/1998 | Marshall et al. | |
| 5,717,452 A | 2/1998 | Janin et al. | |
| 5,721,829 A | 2/1998 | Dunn et al. | |
| 5,727,060 A | 3/1998 | Young | |
| 5,732,216 A | 3/1998 | Logan et al. | |
| 5,734,119 A | 3/1998 | France et al. | |
| 5,742,443 A | 4/1998 | Tsao et al. | |
| 5,745,710 A | 4/1998 | Clanton, III et al. | |
| 5,751,282 A | 5/1998 | Girard et al. | |
| 5,751,672 A | 5/1998 | Yankowski et al. | |
| 5,752,159 A | 5/1998 | Faust et al. | |
| 5,752,160 A | 5/1998 | Dunn | |
| 5,754,771 A | 5/1998 | Epperson et al. | |
| 5,758,257 A | 5/1998 | Herz et al. | |
| 5,758,258 A | 5/1998 | Shoff et al. | |
| 5,758,259 A | 5/1998 | Lawler | |
| 5,760,821 A | 6/1998 | Ellis et al. | |
| 5,761,417 A | 6/1998 | Henley et al. | |
| 5,761,607 A | 6/1998 | Gudesen et al. | |
| 5,768,528 A | 6/1998 | Stumm | |
| 5,771,354 A | 6/1998 | Crawford | |
| 5,774,170 A | 6/1998 | Hite et al. | |
| 5,778,181 A | 7/1998 | Hidary et al. | |
| 5,778,182 A | 7/1998 | Cathey et al. | |
| 5,778,187 A | 7/1998 | Monteiro et al. | |
| 5,781,226 A | 7/1998 | Sheehan | |
| 5,781,227 A | 7/1998 | Goode et al. | |
| 5,781,228 A | 7/1998 | Sposato | |
| 5,790,198 A | 8/1998 | Roop et al. | |
| 5,790,423 A | 8/1998 | Lau et al. | |
| 5,793,366 A | 8/1998 | Mano et al. | |
| 5,793,412 A | 8/1998 | Asamizuya | |
| 5,793,971 A | 8/1998 | Fujita et al. | |
| 5,794,217 A | 8/1998 | Allen | |
| 5,796,952 A | 8/1998 | Davis et al. | |
| 5,798,921 A | 8/1998 | Johnson et al. | |
| 5,802,284 A | 9/1998 | Karlton et al. | |
| 5,805,154 A | 9/1998 | Brown | |
| 5,805,763 A | 9/1998 | Lawler et al. | |
| 5,805,804 A | 9/1998 | Laursen et al. | |
| 5,805,806 A | 9/1998 | McArthur | |
| 5,808,608 A | 9/1998 | Young et al. | |
| 5,808,694 A | 9/1998 | Usui et al. | |
| 5,809,204 A | 9/1998 | Young et al. | |
| 5,809,246 A | 9/1998 | Goldman | |
| 5,812,123 A | 9/1998 | Rowe et al. | |
| 5,812,205 A | 9/1998 | Milnes et al. | |
| 5,815,146 A | 9/1998 | Youden et al. | |
| 5,815,297 A | 9/1998 | Ciciora | |
| 5,818,438 A | 10/1998 | Howe et al. | |
| 5,819,019 A | 10/1998 | Nelson | |
| 5,819,160 A | 10/1998 | Foladare et al. | |
| 5,822,530 A | 10/1998 | Brown | |
| 5,828,945 A | 10/1998 | Klosterman | |
| RE35,954 E | 11/1998 | Levine | |
| 5,835,126 A | 11/1998 | Lewis | |
| 5,841,979 A | 11/1998 | Schulhof et al. | |
| 5,844,620 A | 12/1998 | Coleman et al. | |
| 5,850,218 A | 12/1998 | LaJoie et al. | |
| 5,861,906 A | 1/1999 | Dunn et al. | |
| 5,881,245 A | 3/1999 | Thompson | |
| 5,883,621 A | 3/1999 | Iwamura | |
| 5,884,028 A | 3/1999 | Kindell et al. | |
| 5,884,141 A | 3/1999 | Inoue et al. | |
| 5,886,707 A | 3/1999 | Berg | |
| 5,886,732 A | 3/1999 | Humpleman | |
| 5,887,243 A | 3/1999 | Harvey et al. | |
| 5,892,915 A | 4/1999 | Duso et al. | |
| 5,894,589 A | 4/1999 | Reber et al. | |
| 5,896,414 A | 4/1999 | Meyer et al. | |
| 5,898,441 A | 4/1999 | Flurry | |
| 5,898,456 A | 4/1999 | Wahl | |
| 5,899,582 A | 5/1999 | DuLac | |
| 5,900,904 A | 5/1999 | Okada et al. | |
| 5,903,234 A | 5/1999 | Kimura | |
| 5,903,263 A | 5/1999 | Emura | |
| 5,903,264 A | 5/1999 | Moeller et al. | |
| 5,905,522 A | 5/1999 | Lawler | |
| 5,905,847 A | 5/1999 | Kobayashi et al. | |
| 5,909,638 A | 6/1999 | Allen | |
| 5,911,046 A | 6/1999 | Amano | |
| 5,913,039 A | 6/1999 | Nakamura et al. | |
| 5,914,941 A | 6/1999 | Janky | |

| Patent No. | Date | Inventors |
|---|---|---|
| 5,915,090 A | 6/1999 | Joseph et al. |
| 5,915,094 A | 6/1999 | Kouloheris et al. |
| 5,916,303 A | 6/1999 | Scott |
| 5,917,538 A | 6/1999 | Asamizuya |
| 5,917,835 A | 6/1999 | Barrett et al. |
| 5,920,702 A | 7/1999 | Bleidt et al. |
| 5,920,800 A | 7/1999 | Schafer |
| 5,922,045 A | 7/1999 | Hanson |
| 5,922,048 A | 7/1999 | Emura |
| 5,923,361 A | 7/1999 | Sutton, Jr. |
| 5,926,205 A | 7/1999 | Krause et al. |
| 5,926,624 A | 7/1999 | Katz et al. |
| 5,928,327 A | 7/1999 | Wang et al. |
| 5,929,850 A | 7/1999 | Broadwin et al. |
| 5,930,473 A | 7/1999 | Teng et al. |
| 5,930,493 A | 7/1999 | Ottesen et al. |
| 5,931,901 A | 8/1999 | Wolfe et al. |
| 5,933,603 A | 8/1999 | Vahalia et al. |
| 5,933,835 A | 8/1999 | Adams et al. |
| 5,935,206 A | 8/1999 | Dixon et al. |
| 5,936,569 A | 8/1999 | Stahle et al. |
| 5,940,071 A | 8/1999 | Treffers et al. |
| 5,940,073 A | 8/1999 | Klosterman et al. |
| 5,943,046 A | 8/1999 | Cave et al. |
| 5,943,047 A | 8/1999 | Suzuki |
| 5,945,987 A | 8/1999 | Dunn |
| 5,945,988 A | 8/1999 | Williams et al. |
| 5,947,746 A | 9/1999 | Tsai |
| 5,949,411 A | 9/1999 | Doerr et al. |
| 5,949,954 A | 9/1999 | Young et al. |
| 5,956,482 A | 9/1999 | Aqraharam et al. |
| 5,956,716 A | 9/1999 | Kenner et al. |
| 5,959,659 A | 9/1999 | Dokic |
| 5,963,202 A | 10/1999 | Polish |
| 5,964,455 A | 10/1999 | Catanzarite et al. |
| 5,969,283 A * | 10/1999 | Looney et al. ................. 84/609 |
| 5,969,714 A | 10/1999 | Butcher |
| 5,973,680 A | 10/1999 | Ueda |
| 5,973,722 A | 10/1999 | Wakai et al. |
| 5,974,217 A | 10/1999 | Haraguchi |
| 5,977,963 A | 11/1999 | Gaughan et al. |
| 5,977,964 A | 11/1999 | Williams et al. |
| 5,978,567 A | 11/1999 | Rebane et al. |
| 5,978,843 A | 11/1999 | Wu et al. |
| 5,986,650 A | 11/1999 | Ellis et al. |
| 5,990,881 A | 11/1999 | Inoue et al. |
| 5,999,970 A | 12/1999 | Krisbergh et al. |
| 6,002,394 A | 12/1999 | Schein et al. |
| 6,002,720 A | 12/1999 | Yurt et al. |
| 6,005,564 A | 12/1999 | Ahmad et al. |
| 6,005,600 A | 12/1999 | Hill |
| 6,006,257 A | 12/1999 | Slezak |
| 6,008,802 A | 12/1999 | Iki et al. |
| 6,009,465 A | 12/1999 | Decker et al. |
| 6,012,089 A | 1/2000 | Hasegawa |
| 6,012,091 A | 1/2000 | Boyce |
| 6,014,184 A | 1/2000 | Knee et al. |
| 6,014,381 A | 1/2000 | Troxel et al. |
| 6,014,694 A | 1/2000 | Aharoni et al. |
| 6,014,706 A | 1/2000 | Cannon et al. |
| 6,018,359 A | 1/2000 | Kermiode et al. |
| 6,018,765 A | 1/2000 | Durana et al. |
| 6,020,912 A | 2/2000 | De Lang |
| 6,022,223 A | 2/2000 | Taniguchi et al. |
| 6,023,725 A | 2/2000 | Ozawa et al. |
| 6,025,868 A | 2/2000 | Russo |
| 6,028,600 A | 2/2000 | Rosin et al. |
| 6,029,064 A | 2/2000 | Farris et al. |
| 6,032,202 A | 2/2000 | Lea et al. |
| 6,038,591 A | 3/2000 | Wolfe et al. |
| 6,038,614 A | 3/2000 | Chan et al. |
| 6,049,831 A | 4/2000 | Gardell et al. |
| 6,052,145 A | 4/2000 | Macrae et al. |
| 6,085,236 A | 7/2000 | Lea |
| 6,091,883 A | 7/2000 | Artigalas et al. |
| 6,098,082 A | 8/2000 | Gibbon et al. |
| 6,111,677 A | 8/2000 | Shintani et al. |
| 6,118,450 A | 9/2000 | Proehl |
| 6,125,230 A | 9/2000 | Yaginuma |
| 6,141,488 A | 10/2000 | Knudson et al. |
| 6,147,715 A | 11/2000 | Yuen et al. |
| 6,154,206 A | 11/2000 | Ludtke |
| 6,160,546 A | 12/2000 | Thompson et al. |
| 6,160,796 A | 12/2000 | Zou |
| 6,166,730 A | 12/2000 | Goode et al. |
| 6,167,188 A | 12/2000 | Young et al. |
| 6,169,725 B1 | 1/2001 | Gibbs et al. |
| 6,170,006 B1 | 1/2001 | Namba |
| 6,177,931 B1 | 1/2001 | Alexander et al. |
| 6,182,094 B1 * | 1/2001 | Humpleman et al. ........ 715/234 |
| 6,184,878 B1 | 2/2001 | Alonso et al. |
| 6,208,335 B1 | 3/2001 | Gordon et al. |
| 6,208,341 B1 | 3/2001 | van Ee et al. |
| 6,219,839 B1 | 4/2001 | Sampsell |
| 6,232,539 B1 | 5/2001 | Looney et al. |
| 6,236,395 B1 | 5/2001 | Sezan et al. |
| 6,237,049 B1 | 5/2001 | Ludtke |
| 6,239,794 B1 | 5/2001 | Yuen et al. |
| 6,243,707 B1 | 6/2001 | Humpleman et al. |
| 6,243,725 B1 | 6/2001 | Hempleman |
| 6,263,503 B1 | 7/2001 | Margulis |
| 6,289,165 B1 | 9/2001 | Abecassis |
| 6,314,575 B1 | 11/2001 | Billock et al. |
| 6,324,338 B1 | 11/2001 | Wood et al. |
| 6,353,700 B1 | 3/2002 | Zhou |
| 6,356,971 B1 | 3/2002 | Katz |
| 6,359,661 B1 | 3/2002 | Nickum |
| 6,388,714 B1 | 5/2002 | Schein et al. |
| 6,393,430 B1 | 5/2002 | Van Ryzin |
| 6,441,832 B1 | 8/2002 | Tao et al. |
| 6,456,621 B1 | 9/2002 | Wada et al. |
| RE37,881 E | 10/2002 | Haines |
| 6,466,080 B2 | 10/2002 | Kawai |
| 6,473,559 B1 | 10/2002 | Knudson et al. |
| 6,483,986 B1 | 11/2002 | Krapf |
| 6,487,145 B1 | 11/2002 | Berhan |
| 6,487,362 B1 | 11/2002 | Yuen et al. |
| 6,496,981 B1 | 12/2002 | Wistendahl et al. |
| 6,498,895 B2 | 12/2002 | Young et al. |
| 6,505,348 B1 | 1/2003 | Knowles et al. |
| 6,564,378 B1 | 5/2003 | Satterfield et al. |
| 6,577,735 B1 | 6/2003 | Bharat |
| 6,647,417 B1 | 11/2003 | Hunter et al. |
| 6,657,116 B1 | 12/2003 | Gunnerson |
| 6,671,882 B1 | 12/2003 | Murphy et al. |
| 6,741,617 B2 * | 5/2004 | Rosengren et al. ........... 370/536 |
| 6,751,402 B1 | 6/2004 | Elliott et al. |
| 6,756,997 B1 | 6/2004 | Ward, III et al. |
| 6,813,775 B1 | 11/2004 | Finseth et al. |
| 6,816,175 B1 | 11/2004 | Hamp et al. |
| 6,816,904 B1 | 11/2004 | Ludwig et al. |
| 6,820,278 B1 | 11/2004 | Ellis |
| 6,826,512 B2 | 11/2004 | Dara-Abrams et al. |
| 6,837,789 B2 | 1/2005 | Garahi et al. |
| 6,839,769 B2 | 1/2005 | Needham |
| 6,850,693 B2 | 2/2005 | Young et al. |
| 6,882,793 B1 | 4/2005 | Fu |
| 6,901,603 B2 | 5/2005 | Zeidler |
| 6,931,593 B1 | 8/2005 | Grooters |
| 6,934,964 B1 | 8/2005 | Schaffer et al. |
| 6,938,101 B2 | 8/2005 | Hayes et al. |
| 6,950,624 B2 | 9/2005 | Kim et al. |
| 6,973,474 B2 | 12/2005 | Hatayama |
| 7,039,643 B2 * | 5/2006 | Sena et al. ................... 707/101 |
| 7,047,377 B2 | 5/2006 | Elder et al. |
| 7,058,635 B1 | 6/2006 | Shah-Nazaroff |
| 7,086,077 B2 | 8/2006 | Giammaressi |
| 7,098,958 B2 | 8/2006 | Wredenhagen et al. |
| 7,103,906 B1 | 9/2006 | Katz et al. |
| 7,143,432 B1 | 11/2006 | Brooks et al. |
| 7,159,235 B2 | 1/2007 | Son et al. |
| 7,178,161 B1 | 2/2007 | Fristoe et al. |
| 7,213,071 B2 | 5/2007 | DeLima et |
| 7,231,175 B2 | 6/2007 | Ellis |
| 7,237,253 B1 | 6/2007 | Blackketter et al. |
| 7,240,356 B2 | 7/2007 | Iki |
| 7,248,778 B1 | 7/2007 | Anderson et al. |
| 7,260,461 B2 | 8/2007 | Rao et al. |

| | | |
|---|---|---|
| 7,269,733 B1 | 9/2007 | O'Toole, Jr. |
| 7,483,964 B1 | 1/2009 | Jackson et al. |
| 7,574,723 B2 | 8/2009 | Putterman et al. |
| 7,650,621 B2 | 1/2010 | Thomas et al. |
| 7,684,673 B2 | 3/2010 | Monroe |
| 7,689,510 B2 | 3/2010 | Lamkin et al. |
| 7,840,977 B2 | 11/2010 | Walker |
| 7,917,933 B2 | 3/2011 | Thomas et al. |
| 2001/0004338 A1 | 6/2001 | Yankowski |
| 2001/0007147 A1 | 7/2001 | Goldschmidt Iki et al. |
| 2001/0026287 A1 | 10/2001 | Watanabe |
| 2001/0039660 A1 | 11/2001 | Vasilevsky |
| 2001/0042107 A1* | 11/2001 | Palm .................. 709/218 |
| 2001/0043700 A1 | 11/2001 | Shima et al. |
| 2002/0010652 A1 | 1/2002 | Deguchi |
| 2002/0043700 A1 | 4/2002 | Sasaki et al. |
| 2002/0046315 A1 | 4/2002 | Miller |
| 2002/0056087 A1 | 5/2002 | Berezowski et al. |
| 2002/0059588 A1 | 5/2002 | Huber |
| 2002/0059642 A1 | 5/2002 | Russ |
| 2002/0069218 A1 | 6/2002 | Sull et al. |
| 2002/0069746 A1* | 6/2002 | Taira et al. .................. 84/609 |
| 2002/0070982 A1 | 6/2002 | Hill |
| 2002/0078293 A1 | 6/2002 | Kou et al. |
| 2002/0082901 A1 | 6/2002 | Dunning et al. |
| 2002/0087588 A1 | 7/2002 | McBride et al. |
| 2002/0088011 A1 | 7/2002 | Lamkin et al. |
| 2002/0104091 A1 | 8/2002 | Prabhu et al. |
| 2002/0113824 A1 | 8/2002 | Myers, Jr. |
| 2002/0120935 A1 | 8/2002 | Huber et al. |
| 2002/0161579 A1* | 10/2002 | Saindon et al. .................. 704/235 |
| 2002/0166123 A1 | 11/2002 | Schrader |
| 2002/0174430 A1 | 11/2002 | Ellis et al. |
| 2002/0174444 A1 | 11/2002 | Gatto |
| 2002/0180803 A1 | 12/2002 | Kaplan |
| 2002/0188735 A1 | 12/2002 | Needham |
| 2002/0194011 A1 | 12/2002 | Boies et al. |
| 2002/0194260 A1 | 12/2002 | Headley |
| 2003/0005446 A1 | 1/2003 | Jaff et al. |
| 2003/0035404 A1 | 2/2003 | Ozluturk |
| 2003/0046437 A1 | 3/2003 | Eytchison et al. |
| 2003/0066084 A1 | 4/2003 | Kaars |
| 2003/0066092 A1 | 4/2003 | Wagner |
| 2003/0068154 A1 | 4/2003 | Zylka |
| 2003/0105813 A1 | 6/2003 | Mizutani |
| 2003/0110499 A1 | 6/2003 | Knudson et al. |
| 2003/0135860 A1 | 7/2003 | Dureau |
| 2003/0149980 A1 | 8/2003 | Ellis |
| 2003/0149988 A1 | 8/2003 | Ellis |
| 2003/0152096 A1 | 8/2003 | Chapman |
| 2003/0162096 A1 | 8/2003 | Michot et al. |
| 2003/0163832 A1 | 8/2003 | Tsuria et al. |
| 2003/0194260 A1 | 10/2003 | Ward et al. |
| 2003/0214955 A1 | 11/2003 | Kim |
| 2003/0220091 A1 | 11/2003 | Farrand et al. |
| 2004/0008971 A1 | 1/2004 | Young et al. |
| 2004/0008972 A1 | 1/2004 | Haken |
| 2004/0088731 A1 | 5/2004 | Putterman et al. |
| 2004/0117831 A1 | 6/2004 | Ellis |
| 2004/0128686 A1 | 7/2004 | Boyer et al. |
| 2004/0139233 A1 | 7/2004 | Kellerman et al. |
| 2004/0156614 A1 | 8/2004 | Bumgardner et al. |
| 2004/0181814 A1 | 9/2004 | Ellis et al. |
| 2004/0184763 A1* | 9/2004 | DiFrancesco .................. 386/1 |
| 2004/0193648 A1 | 9/2004 | Lai et al. |
| 2004/0220091 A1 | 11/2004 | Adam et al. |
| 2004/0226034 A1 | 11/2004 | Kaczowka et al. |
| 2004/0237104 A1 | 11/2004 | Cooper et al. |
| 2004/0255326 A1 | 12/2004 | Alson |
| 2004/0259537 A1 | 12/2004 | Ackley |
| 2004/0267965 A1 | 12/2004 | Vasudevan et al. |
| 2005/0028208 A1 | 2/2005 | Ellis |
| 2005/0039208 A1 | 2/2005 | Veeck |
| 2005/0044567 A1 | 2/2005 | Young et al. |
| 2005/0071876 A1 | 3/2005 | van Beek |
| 2005/0102324 A1* | 5/2005 | Spring et al. .................. 707/104.1 |
| 2005/0120373 A1 | 6/2005 | Thomas et al. |
| 2005/0132264 A1 | 6/2005 | Joshi et al. |
| 2005/0138658 A1 | 6/2005 | Bryan |
| 2005/0204388 A1 | 9/2005 | Knudson et al. |
| 2005/0227611 A1 | 10/2005 | Ellis |
| 2005/0246393 A1 | 11/2005 | Coates |
| 2005/0251827 A1 | 11/2005 | Ellis et al. |
| 2006/0004685 A1 | 1/2006 | Pyhalammi |
| 2006/0015888 A1 | 1/2006 | Shih |
| 2006/0031883 A1 | 2/2006 | Ellis et al. |
| 2006/0037054 A1 | 2/2006 | McDowell et al. |
| 2006/0064728 A1 | 3/2006 | Son et al. |
| 2006/0080707 A1 | 4/2006 | Laksono |
| 2006/0085835 A1 | 4/2006 | Istvan et al. |
| 2006/0095942 A1 | 5/2006 | van Beek |
| 2006/0173838 A1 | 8/2006 | Garg et al. |
| 2006/0215650 A1 | 9/2006 | Wollmershauser et al. |
| 2006/0238648 A1 | 10/2006 | Wogsberg |
| 2006/0248570 A1 | 11/2006 | Witwer |
| 2006/0253874 A1 | 11/2006 | Stark et al. |
| 2006/0259949 A1 | 11/2006 | Schaefer et al. |
| 2006/0271953 A1 | 11/2006 | Jacoby et al. |
| 2007/0011709 A1 | 1/2007 | Katz |
| 2007/0022442 A1 | 1/2007 | Gil et al. |
| 2007/0028267 A1 | 2/2007 | Ostojic et al. |
| 2007/0055980 A1 | 3/2007 | Megeid et al. |
| 2007/0089160 A1 | 4/2007 | Ando |
| 2007/0094702 A1 | 4/2007 | Khare et al. |
| 2007/0124781 A1 | 5/2007 | Casey et al. |
| 2007/0147351 A1 | 6/2007 | Dietrich et al. |
| 2007/0157234 A1 | 7/2007 | Walker |
| 2007/0157240 A1 | 7/2007 | Walker |
| 2007/0157241 A1 | 7/2007 | Walker |
| 2007/0157242 A1 | 7/2007 | Cordray et al. |
| 2007/0157266 A1 | 7/2007 | Ellis et al. |
| 2007/0162661 A1 | 7/2007 | Fu et al. |
| 2007/0174774 A1 | 7/2007 | Lerman et al. |
| 2007/0198659 A1 | 8/2007 | Lam |
| 2007/0220024 A1 | 9/2007 | Putterman et al. |
| 2007/0220580 A1 | 9/2007 | Putterman et al. |
| 2007/0282969 A1 | 12/2007 | Dietrich et al. |
| 2007/0283046 A1 | 12/2007 | Dietrich et al. |
| 2008/0060001 A1 | 3/2008 | Logan et al. |
| 2008/0263227 A1 | 10/2008 | Roberts et al. |
| 2009/0019492 A1 | 1/2009 | Grasset |
| 2010/0186034 A1 | 7/2010 | Walker |

FOREIGN PATENT DOCUMENTS

| | | |
|---|---|---|
| EP | 0 424 469 | 5/1991 |
| EP | 2 256 115 | 11/1992 |
| EP | 0 535 749 | 4/1993 |
| EP | 0 572 090 | 12/1993 |
| EP | 0 605 115 | 7/1994 |
| EP | 0 624 039 | 11/1994 |
| EP | 0 662 771 | 7/1995 |
| EP | 0 682 452 | 11/1995 |
| EP | 0 711 076 | 5/1996 |
| EP | 0 725 539 | 8/1996 |
| EP | 0753964 | 1/1997 |
| EP | 0 758 833 | 2/1997 |
| EP | 0 763 938 | 3/1997 |
| EP | 0762756 | 3/1997 |
| EP | 0 854 645 | 7/1998 |
| EP | 0 673 160 | 8/1998 |
| EP | 0 874 524 A1 | 10/1998 |
| EP | 0 924 927 | 6/1999 |
| EP | 0 932 275 A2 | 7/1999 |
| EP | 932275 | 7/1999 |
| EP | 0 944 253 | 9/1999 |
| EP | 0 944 257 | 9/1999 |
| EP | 0940985 | 9/1999 |
| EP | 0 986 046 | 3/2000 |
| EP | 1217787 | 6/2002 |
| EP | 1217787 A2 | 6/2002 |
| EP | 1427148 | 11/2003 |
| EP | 1427148 | 6/2006 |
| JP | 60/061935 | 9/1985 |
| JP | 06111413 | 4/1994 |
| JP | 06303541 | 10/1994 |
| JP | 07-336318 | 12/1995 |
| JP | 09 214873 | 8/1997 |
| JP | 10 065978 | 3/1998 |

| | | |
|---|---|---|
| JP | 11 032272 | 2/1999 |
| JP | 11-177962 | 7/1999 |
| JP | 11 205711 | 7/1999 |
| JP | 2003-162444 A | 6/2003 |
| JP | 2003-209893 A | 7/2003 |
| JP | H11-341040 | 12/2009 |
| KR | 1999-0086454 | 12/1999 |
| TW | 247388 | 10/1994 |
| WO | WO-88/04507 | 6/1988 |
| WO | WO 89/12370 | 12/1989 |
| WO | WO 90/00847 | 1/1990 |
| WO | WO 91/00670 | 1/1991 |
| WO | WO 91/07050 | 5/1991 |
| WO | WO 92/04801 | 3/1992 |
| WO | WO 93/08542 | 4/1993 |
| WO | WO 93/22877 | 11/1993 |
| WO | WO 95/01058 | 1/1995 |
| WO | WO-95/04431 | 2/1995 |
| WO | WO 95/15658 | 6/1995 |
| WO | WO 95/31069 | 11/1995 |
| WO | WO 95/32583 | 11/1995 |
| WO | WO 95/32584 | 11/1995 |
| WO | WO 95/32585 | 11/1995 |
| WO | WO 95/32587 | 11/1995 |
| WO | WO 96/09721 | 3/1996 |
| WO | WO 96/17467 | 6/1996 |
| WO | WO 96/25821 | 8/1996 |
| WO | WO-96/31980 | 10/1996 |
| WO | WO 96/33572 | 10/1996 |
| WO | WO 96/34467 | 10/1996 |
| WO | WO-96/34491 | 10/1996 |
| WO | WO 96/41472 | 12/1996 |
| WO | WO-96/41478 | 12/1996 |
| WO | WO-97/13368 | 4/1997 |
| WO | WO 97/21291 | 6/1997 |
| WO | WO 97/32434 | 9/1997 |
| WO | WO 97/34413 | 9/1997 |
| WO | WO 97/34414 | 9/1997 |
| WO | WO 97/37500 | 10/1997 |
| WO | WO-97/40623 | 10/1997 |
| WO | WO 97/42763 | 11/1997 |
| WO | WO 97/46016 | 12/1997 |
| WO | WO-97/46943 | 12/1997 |
| WO | WO-97/47124 | 12/1997 |
| WO | WO 97/48228 | 12/1997 |
| WO | WO 97/49237 | 12/1997 |
| WO | WO 98/01995 | 1/1998 |
| WO | WO 98/07277 | 2/1998 |
| WO | WO 98/10589 | 3/1998 |
| WO | WO 98/12872 | 3/1998 |
| WO | WO-98/17064 | 4/1998 |
| WO | WO 98/18260 | 4/1998 |
| WO | WO 98/19459 | 5/1998 |
| WO | WO 98/26528 | 6/1998 |
| WO | WO 98/26584 | 6/1998 |
| WO | WO 98/26596 | 6/1998 |
| WO | WO 98/31115 | 7/1998 |
| WO | WO 98/31116 | 7/1998 |
| WO | WO 98/34405 | 8/1998 |
| WO | WO 98/38831 | 9/1998 |
| WO | WO 98/47279 | 10/1998 |
| WO | WO 98/47283 | 10/1998 |
| WO | WO 98/48566 | 10/1998 |
| WO | WO 99/03267 | 1/1999 |
| WO | WO 99/04561 | 1/1999 |
| WO | WO 99/11060 | 3/1999 |
| WO | WO 99/12320 | 3/1999 |
| WO | WO-99/14945 | 3/1999 |
| WO | WO99/14945 A1 | 3/1999 |
| WO | WO 99/14945 A1 | 3/1999 |
| WO | WO 99/27681 | 6/1999 |
| WO | WO 99/28897 | 6/1999 |
| WO | WO-99/35753 | 7/1999 |
| WO | WO 99/35753 A3 | 7/1999 |
| WO | WO99/35753 A3 | 7/1999 |
| WO | WO 99/39466 | 8/1999 |
| WO | WO 99/56473 | 11/1999 |
| WO | WO-99/60790 | 11/1999 |
| WO | WO-99/64969 | 12/1999 |
| WO | WO99/64969 A2 | 12/1999 |
| WO | WO 99/64969 A2 | 12/1999 |
| WO | WO 99/65244 | 12/1999 |
| WO | WO 99/66725 | 12/1999 |
| WO | WO 00/04706 | 1/2000 |
| WO | WO 00/05885 | 2/2000 |
| WO | WO 00/11869 | 3/2000 |
| WO | WO 00/16548 | 3/2000 |
| WO | WO-00/17738 | 3/2000 |
| WO | WO00/17738 A1 | 3/2000 |
| WO | WO 00/17738 A1 | 3/2000 |
| WO | WO 00/30345 | 5/2000 |
| WO | WO 00/33208 | 6/2000 |
| WO | WO 00/33560 | 6/2000 |
| WO | WO 00/33565 | 6/2000 |
| WO | WO-00/59230 | 10/2000 |
| WO | WO00/59230 A1 | 10/2000 |
| WO | WO 00/59230 A1 | 10/2000 |
| WO | WO 01/01677 | 1/2001 |
| WO | WO 01/01689 | 1/2001 |
| WO | WO 01/35662 | 5/2001 |
| WO | WO 01/50743 | 7/2001 |
| WO | WO-03/046727 | 6/2003 |
| WO | WO 2004/61699 | 7/2004 |
| WO | WO 2007/078503 | 7/2007 |

OTHER PUBLICATIONS

Dimitrova, et al. "Personalizing Video Recorders Using Multimedia Processing and Integration." ACM 2001.
Haas et al., Proccedings of ICIP 2002 "Personalized News Through Content Augmentation and Profiling", Rochester, NY, Sep. 2002.
U.S. Appl. No. 09/330,860, filed Jun. 11, 1999, Ellis.
U.S. Appl. No. 09/354,344, filed Jul. 16, 1999, Ellis.
International Search Report of the International Searching Authority for related foreign application PCT/US2006/049398.
Office Action dated Sep. 21, 2009 for related U.S. Appl. No. 10/288,505.
Hofmann, Neumann, Oberlies, and Schadwinkel, "Videotext Programmiert Videorecorder," Rundfunktechnische Mitteilungen, Nov.-Dec. 1982, pp. 254-257 (translation attached).
"Electronic Programme Guide (EPG); Protocol for a TV Guide using electronic data transmission" by European Telecommunications Standards Institute, May 1997, Valbonne, France, publication ETS 300 707.
"Windows 98 Feature Combines TV, Terminal and the Internet," New York Times, Aug. 18, 1998.
"Digital Video Broadcasting (DVB): DVB specification for data broadcasting", European Telecommunications Standards Institute, Draft EN 301 192 V1.2.1 (Jan. 1999).
"Rewind, reply and unwind with new high-tech TV devices," by Lawrence J. Magid, LA Times (This document was printed from the internet on Jun. 6, 1999 and bears a date of May 19, 1999).
U.S. Appl. No. 09/910,316, filed Jul. 19, 2001, Putterman.
U.S. Appl. No. 10/099,064, filed Mar. 14, 2002, Putterman.
U.S. Appl. No. 10/288,505, filed Nov. 1, 2002, Putterman.
U.S. Appl. No. 11/318,793, filed Dec. 27, 2005, Dietrich.
U.S. Appl. No. 11/444,564, filed Jun. 1, 2006, Dietrich.
U.S. Appl. No. 11/595,737, filed Nov. 10, 2006, Dietrich.
Office Action dated Feb. 3, 2010 for related JP Patent Application 2004-550446.
Office Action dated Feb. 25, 2010 for related EU Patent Application 06848226.4.
Office Action dated Mar. 29, 2010 for related U.S. Appl. No. 10/288,505.
Jaidev, "XSLT A Wired and Wireless Case Study," http://csharpcomputing.com/ XMLTutorial/Lesson15.htm.
Randerson, J., "Let Software Catch the Game for You," New Scientist, Jul. 3, 2004.
Papers Delivered (Part 1), 61$^{st}$ National Conference, Information Processing Society of Japan, Oct. 3-5, 2000.
Pogue, D., "State of the Art: For TiVo and Replay, New Reach," N.Y. Times, May 29, 2003.
Realplayer 8 Plus User Manual, Rev. 1, Real Networks, Inc. p. 32 (2000).

CableData brochure, "A New Approach to Addressability" (undated).
"Addressable Converters: A New Development at CableData," Via Cable, vol. 1, No. 12 (Dec. 1981).
Hofmann et al., "Videotext Programmiert Videorecorder," Rundfunktechnische Mitteilungen, Nov.-Dec. 1982, pp. 254-57 (translation abstract attached).
Sorce, J. et al., "Designing a Broadband Residential Entertainment Service: A Case Study," 13th International Symposium Human Factors in Telecommunications, Torino, Italy, Sep. 10-14, 1990 pp. 141-148.
Brugliera, V. "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).
Miller, M. D. "A Scenario for the Deployment of Interactive Multimedia Cable Television Systems in the United States in the 1990's," Proceedings of the IEEE, vol. 82, No. 4, pp. 585-589 (Apr. 1994).
Chang, Y. et al., "An Open-Systems Approach to Video on Demand," IEEE Communications Magazine, vol. 32, No. 5 pp. 68-80 (May 1994).
The New York Times Website Article, "2 Makers Plan Introductions of Digital VCR", by John Markoff, Mar. 29, 1999.
David M. Rudnick, U.S. Appl. No. 09/283,681, Filed Apr. 1, 1999, entitled Interactive Television Program Guide System Having Graphic Arrangements of Program Event Regions.
Li et al., "Distributed Multimedia Systems," Proceedings of the IEEE vol. 85 No. 7: pp. 1063-1108 (Jul. 1997).
S. Gondow et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.
F. Teraoka et al., "Host Migration Transparancy in IP networks: The VIP Approach" ACM SIGCOMM—Computer Communication Review, ACM Press, New York, NY, USA, Jan. 1993, pp. 45-65.
A. C. Snoeren et al., "An End-to-End Approach to Host Mobility" 6th ACM/IEEE International Conference on Mobile Computing and Networking (MOBICOM 2000), Boston, MA, USA, Aug. 2000, pp. 1-12.
Pham et al "Exploiting Location-Based Composite Devices to Support and Facilitate Situated Ubiquitous Computing," HUC 2000, LNCS 1927, pp. 143-156.
Arango et al., "The Touring Machine System," Communications of the ACM, Jan. 1993, vol. 36, No. 1, pp. 68-77.
Fortino et al., A Cooperative Playback System for On-Demand Multimedia Sessions over Internet, 2000 IEEE, pp. 41-44.
Han et al., "Dynamic Adaptation in an Image Transcoding Proxy for Mobile Web Browsing," IEEE Personal Communications, Dec. 1998, pp. 8-17.
Mah et al., "Providing Network Video Service to Mobile Clients," 1993 IEEE, pp. 48-54.
IBM Corporation "IBM Content Manager VideoCharger, New dimensions for enterprise content, DB2 Data Management Software" pp. 1-4, Mar. 2002.
IBM Corporation IBM VideoCharger for AIX Version 2.0 "Streaming the power of video to your desktop, pp. 1-5" Visit the IBM VideoCharger Website at: www.software.ibm.com/data/videocharger/.
IBM Corporation "IBM Content Manager VideoCharger, Version 8, New dimensions for enterprise content, DB2 Data Management Software, pp. 1-4," May 2002, Visit IBM Web site at ibm.com/software/data/videocharger.
IBM Corporation, "IBM Video Charger Server", p. 102, Jun. 1998.

* cited by examiner

METHODS AND APPARATUS FOR INTEGRATING DISPARATE MEDIA FORMATS IN A NETWORKED MEDIA SYSTEM

BACKGROUND OF THE INVENTION

1. Field of the Invention:

The present invention is directed toward the field of converging disparate types of media, and more particularly directed integrating media of different formats for playing across devices over a network.

2. Art Background:

The widespread use of computers, digital cameras, and the Internet has resulted in the creation and use of digital media. Digital media has also largely replaced more traditional analog audio and video formats with the introduction and popular acceptance of audio compact discs (CDs) and digital video discs (DVDs). In general, digital media consists of various formats of data that stores audio, video, and images in binary files. These binary files are typically stored on a medium accessible to computer devices, such as CD-ROMs, hard drives, floppy disks and memory sticks.

The storage of digital media on commonly used computer medium allows for easy generation and transfer of digital media. For example, it has become popular to generate digital photos using a digital camera and then to transfer the digital photos onto computers. Computer software permits the user to manipulate the digital photos. The user may then transfer the digital photos to friends using e-mail, or post the digital photos on a web site accessible by the World Wide Web. These types of applications, which take advantage of the connectivity among different devices, have also contributed to the widespread popularity of digital media.

Digital media may be stored in a variety of formats. Special hardware or software compatible with the formats of the digital media is required to playback or view the digital media. For example, to listen to music stored in the popular MP3 format, a consumer must have a special MP3 player (i.e., either software running on a general purpose computer or a stand alone MP3 player). There are numerous formats for video, including high quality DVDs and various compression based MPEG and proprietary standards. To playback various formats of digital video, the consumer must use a device that reads the proper format of the digital media.

Because of the numerous different formats of digital media, the playback or viewing of numerous types of digital media today requires multiple types of devices. The playback of digital media stored in different formats is less problematic on a computer because the computer may play the digital media using software programs. However, a consumer may desire to play the media on other types of devices. For example, the consumer may desire to play digital audio files on a home stereo and view digital video on a television. Currently, stereos and televisions are not equipped to playback all formats of digital media. Accordingly, it is desirable to provide a media convergence platform that integrates various types of digital media into a single system.

SUMMARY OF THE INVENTION

A media system includes at least a source media device and a playback media device coupled through a network. The source media device presents media to the network. The media comprises at least one digital content file with a first format. A playback media device plays back digital content files formatted in a second format. A transcoder, also coupled to the network, converts the first format of the digital content file to a second format. In one embodiment, the transcoder comprises a device separate from the source media device and the playback media device. In another embodiment, the transcoder comprises a device integrated with the source media device. The playback device receives the digital content file, formatted in the second format, over the network, and processes the digital content file in the second format to generate processed signals. The processed signals drive the playback device to play the digital content file.

In one embodiment, the digital content file comprises a digital audio file, and the processed signals comprise audio signals. For example, the first format for the digital content file may comprise a Microsoft Windows Media Audio ("WMA") file, a Moving Pictures Experts Group layer 3 ("MP3") file or a Real Audio file. The second format may comprise, by way of example, a pulse code modulated ("PCM") file or a Moving Pictures Experts Group layer 3 ("MP3") file. In another embodiment, the digital content file comprises a digital video file, and the processed signals comprise video signals. For this embodiment, the first format may comprise, as example formats, a Moving Pictures Experts Group version 4 ("MPEG-4") file, a Moving Joint Photographic Experts Group ("MJPEG") file, a Quicktime file, a Microsoft Windows Media Video ("WMV") file, or a Real Video file. The second video format may comprise a Moving Pictures Experts Group version 2 ("MPEG-2") file.

DETAILED DESCRIPTION

Media Convergence Platform:

The media convergence platform of the present invention provides an efficient and easy way for one or more users to manage and playback media within a "media space." As used herein, a "media space" connotes one or more media storage devices coupled to one or more media players for use by one or more users. The integration of media storage devices and media players into a single media space permits distributed management and control of content available within the media space.

Figure 1:
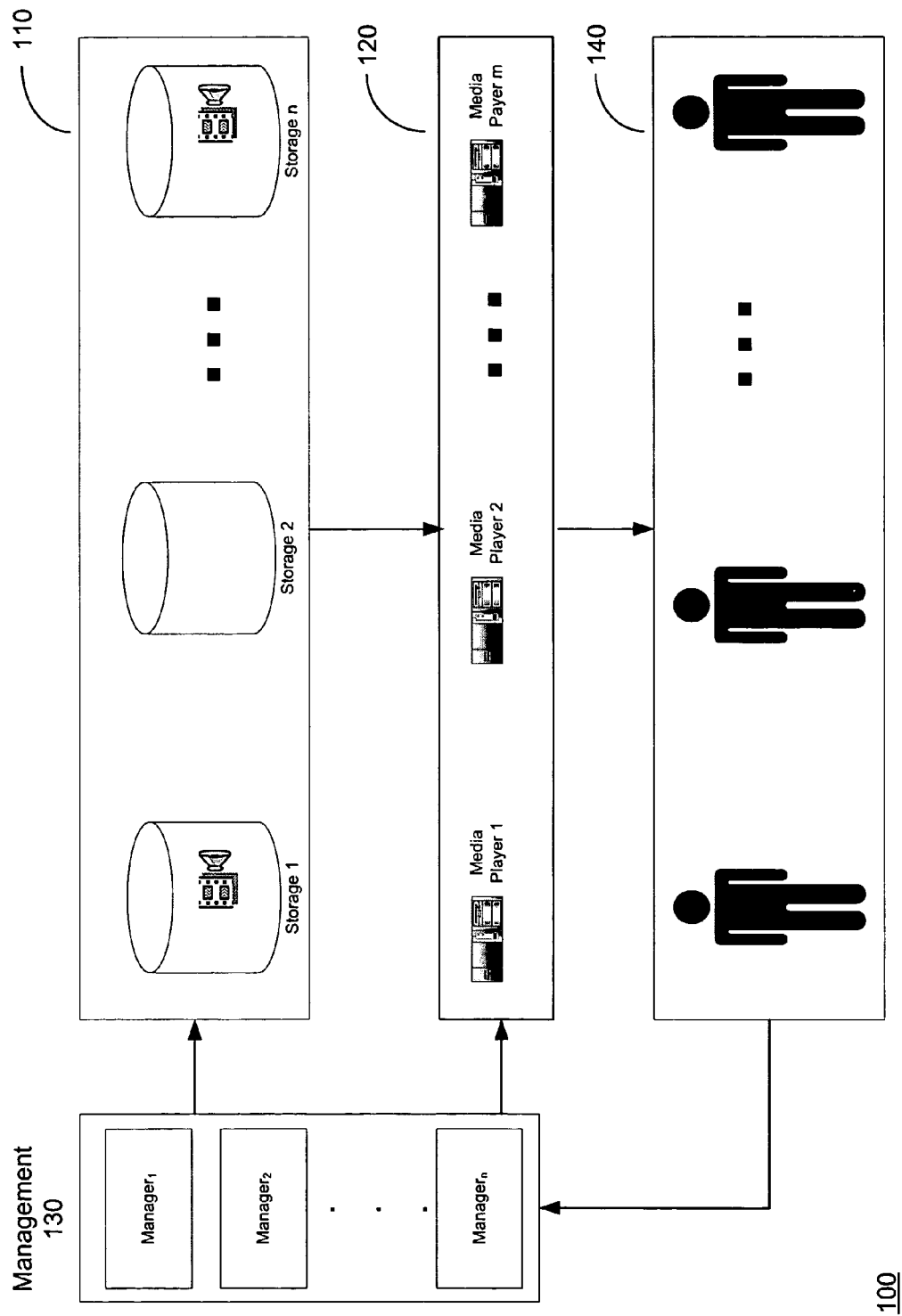
FIG. 1 illustrates a media space configured in accordance with one embodiment of the present invention.

FIG. 1 illustrates a media space configured in accordance with one embodiment of the present invention. As shown in FIG. 1, the media space 100 includes "n" media storage devices 110, where "n" is any integer value greater than or equal to one. The media storage devices 110 store any type of media. In one embodiment, the media storage devices 110 store digital media, such as digital audio, digital video (e.g., DVD, MPEG, etc.), and digital images. The media space 100 also includes "m" media players 120, where "m" is any integer value greater than or equal to one. In general, the media players 120 are devices suitable for playing and or viewing various types of media. For example, a media player may comprise a stereo system for playing music or a television for playing DVDs or viewing digital photos.

As shown in FIG. 1, the media storage devices 110 are coupled to the media players 120. The media storage devices 110 and the media players 120 are shown in FIG. 1 as separate devices to depict the separate functions of media storage and media playback; however, the media players may perform both the storage and playback functions. For example, a media player may comprise a DVD player that includes a hard drive for the storage and playback of digital video. In other embodiments, the storage of media and the playback/viewing of media are performed by separate devices. For this embodiment, the media players 120 playback content stored on the media storage devices 110. For example, a video clip stored on media storage device "1" may be played on any of the applicable "m" media players 120.

The storage devices 110 and media players 120 are controlled by management component 130. In general, management component 130 permits users to aggregate, organize, control (e.g., add, delete or modify), browse, and playback media available within the media space 100. The management component 130 may be implemented across multiple devices. The media space of FIG. 1 shows a plurality of users 140 to depict that more than one user may playback/view media through different media players. The system supports playback of different media through multiple media players (i.e., the system provides multiple streams of media simultaneously). The users 140, through management component 130, may also organize, control, and browse media available within the media space. The management component 130 provides a distributed means to manage and control all media within the media space. As described more fully below, the convergence media platform provides a common language to permit disparate devices to communicate (i.e., different devices utilize different network protocols).

Figure 2:
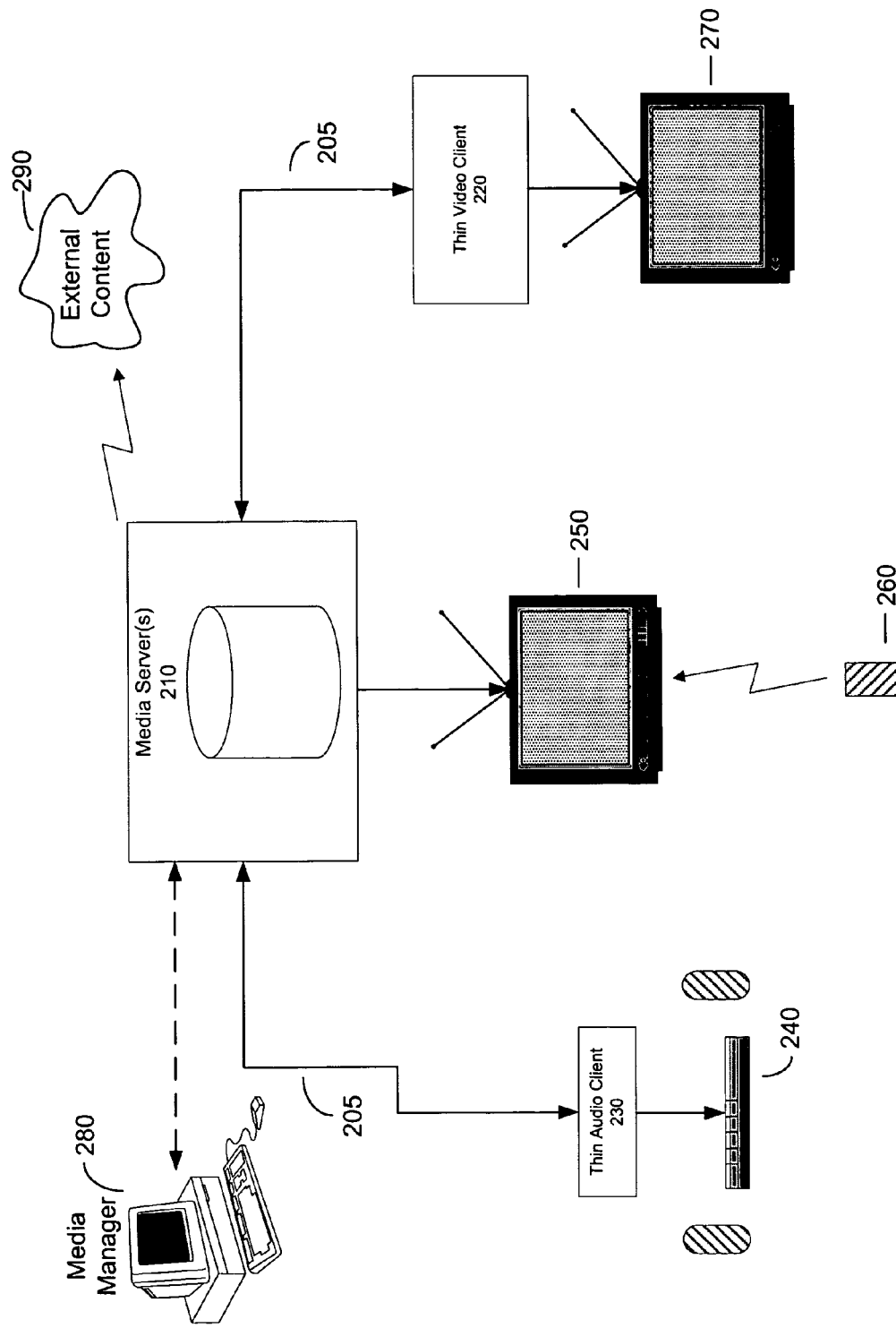
FIG. 2 illustrates one embodiment for integrating devices into a single media space.

FIG. 2 illustrates one embodiment for integrating devices into a single media space. For this embodiment, a media space 200 includes at least one media server 210 (e.g., a media space may include many media servers). The media server 210 stores media for distribution throughout the media space 200. In addition, the media server 210 stores system software to integrate the components of the media space, to distribute media through the media space, and to provide a user interface for the components of the media space. The media server 210 is coupled to different types of media players, including televisions 250 and 270, as well as an audio player 240 (e.g., stereo system). For this embodiment, the media server 210 is also coupled to a media manager 280 and to external content provider(s) 290.

For this embodiment, the media server 210 executes software to perform a variety of functions within the media space. Thus, in this configuration, the media server 210 operates as a "thick client." A user accesses and controls the functions of the media convergence platform through a system user interface. The user interface utilizes the thick and thin clients, as well as some media players (e.g., televisions 250 & 270). In one embodiment, the user interface includes a plurality of interactive screens displayed on media player output devices to permit a user to access the functionality of the system. A screen of the user interface includes one or more items for selection by a user. The user navigates through the user interface using a remote control device (e.g., remote control 260). The user, through use of a remote control, controls the display of screens in the user interface and selects items displayed on the screens. A user interface displayed on a television permits the user, using a remote control, to perform a variety of functions pertaining to the media available in the media space.

The components of the media convergence platform are integrated through a network. For example, in the embodiment of FIG. 2, media server 210 communicates to thin audio client 230 and thin video client 220 through network 205. Network 205 may comprise any type of network, including wireless networks. For example, network 205 may comprise networks implemented in accordance with standards, such as Ethernet 10/100 on Category 5, HPNA, Home Plug, IEEE 802.11x, IEEE 1394, and USB 1.1/2.0.

For the embodiment of FIG. 2, one or more thin video clients are integrated into the media space. Specifically, a thin video client 220 is coupled to media server 210 to provide playback of digital media on television 270. The thin video client 220 does not store media. Instead, the thin video client 270 receives media from media server 210, and processes the media for display or playback on television 270 (e.g., a standard television). For example, media server 210 transmits a digital movie over network 205, and the thin video client processes the digital movie for display on television 270. In one embodiment, the thin video client 220 processes the digital movie "on the fly" to provide NTSC or PAL formatted video for playback on television 270. The thin video client 220 may be integrated into the television 270. In one embodiment, a user interface is implemented using media server 210 and thin video client 220 for display on television 270. For this embodiment, the user, using a remote control for television 270, selects items displayed on television 270 to command the system.

The media convergence platform system also optionally integrates one or more thin audio clients into the media space. For the embodiment of FIG. 2, a thin audio client 230 receives digital music (e.g., MP3 format) from media server 210 over network 205, and processes the digital music for playback on a standard audio system 240. In one embodiment, the thin audio client 210 includes a small display (e.g., liquid crystal display "LCD") and buttons for use as a user interface. The media server 210 transmits items and identifiers for the items for display on the thin audio client 230. For example, the thin audio client 230 may display lists of tracks for playback on audio system 240. The user selects items displayed on the screen using the buttons to command the system. For example, the thin audio client screen may display a list of albums available in the media space, and the user, through use of the buttons, may command the user interface to display a list of tracks for a selected album. Then, the user may select a track displayed on the screen for playback on audio system 240.

The media manager 280 is an optional component for the media convergence platform system. In general, the media manager 280 permits the user to organize, download, and edit media in the personal computer "PC" environment. The media manager may store media for integration into the media space (i.e., store media for use by other components in the media space). In one embodiment, the media manager 280 permits the user to perform system functions on a PC that are less suitable for implementation on a television based user interface.

The media space may be extended to access media stored external to those components located in the same general physical proximity (e.g., a house). In one embodiment, the media convergence platform system integrates content from external sources into the media space. For example, as shown in FIG. 2, the media server 210 may access content external to the local network 205. The external content may include any type of media, such as digital music and video. The media convergence platform system may be coupled to external content 290 through a broadband connection (i.e., high bandwidth communications link) to permit downloading of media rich content. The external content may be delivered to the media convergence platform system through use of the Internet, or the external content may be delivered through use of private distribution networks. In other embodiments, the external content may be broadcasted. For example, the media server 210 may access external content 290 through a data casting service (i.e., data modulated and broadcast using RF, microwave, or satellite technology).

As used herein, a "device" connotes a home network client that supports a collection of services to operate a broader functionality. Also, as used herein, a "media server" is an entity on the home network that stores or presents media items to the network. Furthermore, a "node" connotes any entity on a home network, including a device and/or a media server.

The convergence media platform utilizes a "peer-to-peer" architecture. All client devices on the media platform have the ability to communicate with other devices, including multiple client devices and multiple servers. This architecture permits a device to obtain all media available on the network and to aggregate the media for presentation on that device.

A device, including a client device or a server device, may enter and/or exit the home network, at any time, and still maintain full functionality. Thus, when a device is powered off, other devices automatically recognize that the device is no longer available on the home network. When a new device is added or a portable device comes onto the network, the other nodes automatically recognize the new devices. The other nodes may utilize the services on the added device. A new media server may also automatically recognize new devices, as long as at least one other media server is currently on the network.

Figure 3:
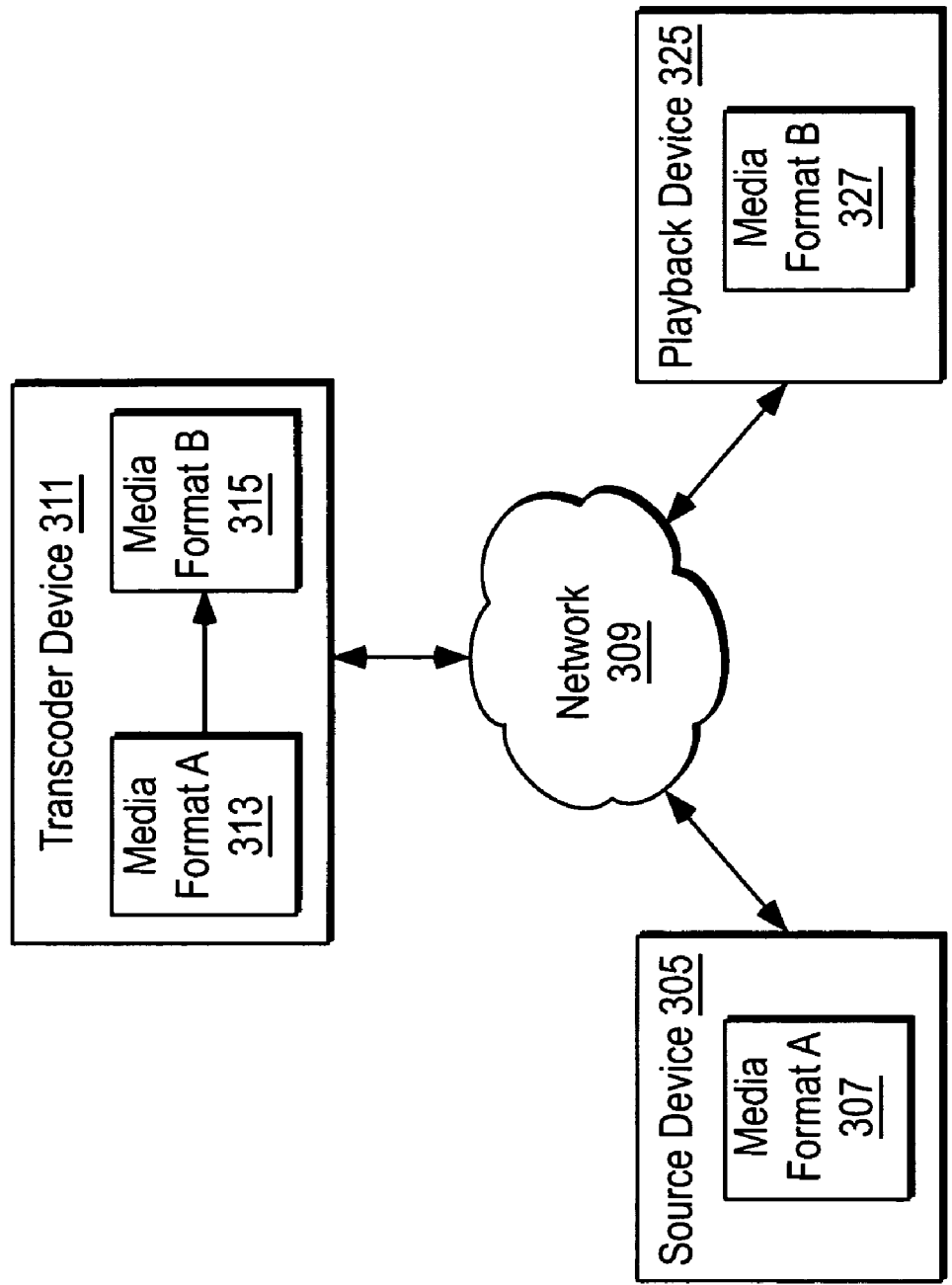
FIG. 3 illustrates one embodiment for a media convergence platform configured in accordance with the present invention.

FIG. 3 illustrates one embodiment for a media convergence platform configured in accordance with the present invention. For this embodiment, a media network 309 couples a source device 305, a playback device 325, and a transcoder device 311. The source device 305, such as a media server, acquires media, in the form of a digital content file, formatted in "Media Format A." In one embodiment, the media is stored in source device 305 on a permanent storage medium (e.g., hard disk drive) or on removable disk (e.g., CD or DVD). In another embodiment, the source device 305 acquires the media from an external source (e.g., Internet).

A transcoder device of the present invention operates as a translator to convert one or more input formats to one or more output formats. A transcoder may be configured to convert between any number and type of audio or video formats. Table 1 lists digital audio formats for conversion in accordance with one embodiment of a transcoder in a media convergence platform.

TABLE 1

| Input Format | Output Format |
| --- | --- |
| Microsoft Windows Media Audio ("WMA") | Pulse Code Modulated ("PCM") |
| Microsoft Windows Media Audio ("WMA") | Moving Pictures Experts Group layer 3 ("MP3") |

TABLE 1-continued

| Input Format | Output Format |
| --- | --- |
| Moving Pictures Experts Group layer 3 ("MP3") | Pulse Code Modulated ("PCM") |
| Real Audio | Pulse Code Modulated ("PCM") |

Table 1 lists example audio formats for conversion in one embodiment of a media convergence platform; however, a transcoder may convert between any two audio formats without deviating from the spirit or scope of the invention.

Table 2 lists digital video formats for conversion in accordance with one embodiment of a media convergence platform transcoder.

TABLE 2

| Input Format | Output Format |
| --- | --- |
| Moving Pictures Experts Group layer 4 ("MPEG-4") | Moving Pictures Experts Group layer 2 ("MPEG-2") |
| Moving Joint Photographic Experts Group ("MJPEG") | Moving Pictures Experts Group layer 2 ("MPEG-2") |
| Quicktime | Moving Pictures Experts Group layer 2 ("MPEG-2") |
| Microsoft Windows Media Video ("WMV") | Moving Pictures Experts Group layer 2 ("MPEG-2") |
| Real Video | Moving Pictures Experts Group layer 2 ("MPEG-2") |

Table 2 identifies several example video formats that may be converted in a media convergence platform. However, a video transcoder may convert between any two video formats without deviating from the spirit or scope of the invention.

For the example of FIG. 3, transcoder device 311 receives media, in the format of "Media Format A", from the source device 305 across network 309. The transcoder device 311 converts the media from "Media Format A" to "Media Format B." The media file, formatted in the converted "Media Format B", is transferred from transcoder 311 to playback device 325

As shown in FIG. 3, the playback device 325 is compatible with media formatted in "Media Format B." As such, the playback device 325 only plays media formatted in Media Format B. The playback device 325 processes the digital content file in the second format to generate processed signals. The processed signals drive the playback device to play the digital content file. In one embodiment, the digital content file comprises a digital audio file, and the processed signals comprise audio signals. In another embodiment, the digital content file comprises a digital video file, and the processed signals comprise video signals.

In one embodiment, the media convergence platform implements the transcoder function in hardware. In other embodiments, the transcoder function is implemented in software. A software transcoder may be implemented using available open source code.

In one embodiment, the transcode function converts the input format of an audio format to a raw format, such as the pulse code modulated ("PCM") format. For example, to conduct the WMA→PCM conversion, the transcoder decodes the Microsoft Windows Media Audio ("WMA") format into the raw PCM format. For this embodiment, to perform the WMA→MP3 conversion, the transcoder decodes the WMA format to the raw PCM format, and then encodes the raw PCM format to the MP3 format. In other embodiments, the transcode function involves partial decoding and partial encoding (e.g., the conversion of the audio is performed fully in the frequency domain instead of converting the audio to a time domain format).

In one embodiment, video formats are also converted to "raw video formats" prior to conversion to other video formats. For example, in one embodiment, the raw video format consists of raw RGB frames. A raw RGB frame is a rasterized bitmap image of each frame in digital video represented as independent red, green and blue color channels for each pixel in each frame image. In other embodiment for generating a raw video format, the transcode function generates raw YUV 4:2:0 frames, raw YUV 4:2:2 frames, and/or raw YUV 4:4:4 frames. In general, the raw YUV 4:2:0, YUV 4:2:2 and YUV 4:4:4 frame formats represent rasterized bitmap images of each frame of digital video represented as independent Y (luminance) as well as U and V (chrominance) component color channels. Specifically, the raw YUV 4:2:0 frames format contains a single Y sample for each pixel, and one of each Cb and Cr chrominance samples spatially located in the center of each four (4) adjacent Y samples. The raw YUV 4:2:2 frames format also contains a single Y sample for each pixel, but contains one of each Cb and Cr chrominance samples spatially located in the center of each two (2) adjacent horizontal Y samples. The raw YUV 4:4:4 frames format contains a single Y sample and one of each Cb and Cr chrominance samples for each pixel.

Figure 4:
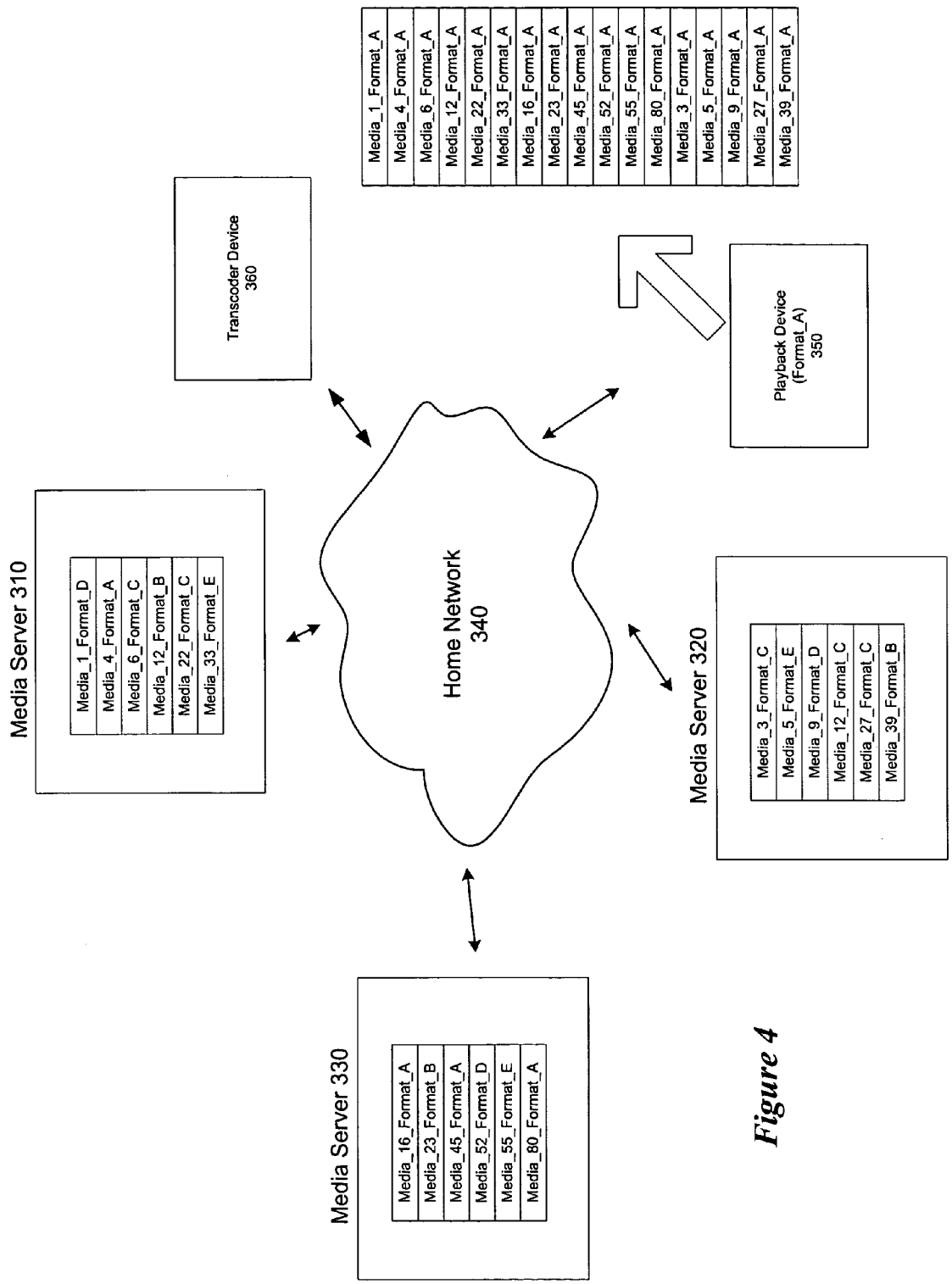
FIG. 4 illustrates an example media system.

FIG. 4 illustrates an example media system. For this example, three media servers (310, 320, and 330) are coupled to home network 340. As shown in FIG. 4, each media server stores several media items. The media items may be any type of media, including video, audio, photos, etc. For example, server 310 stores media items 1, 4, 6, 12, 22 and 33. For this example, playback device 350 is also on the home media network 340. The playback device 350 plays back media, including audio, video or photos. For example, playback device 350 may comprise a DVD player, and the media items, stored on media servers 310, 320 and 330, may comprise DVDs.

As shown in FIG. 4, media items, presented by media servers (310, 320 and 330), are associated with a format. For the example of FIG. 4, media server 330 presents media in formats A, B, D and E. For example, "Format A" may comprise a digital content file formatted as an MPEG 4 file, "Format B" may comprise a digital content file formatted as a Quicktime file, and "Format D" may comprise a digital content file formatted as a Microsoft Windows Media Video ("WMV") file.

For the example of FIG. 4, the playback device 350 only plays media formatted in "Format A." As such, format conversion is required to convert media of Formats B, C, D and E to Format A. The media system of FIG. 4 includes a transcoder device 360. For this embodiment, transcoder device 360 is capable of converting Formats B, C, D and E to Format A. The transcoder device 360 may convert media files "on-the-fly", or it may convert media items for storage at playback device 350 or any other media server.

In one embodiment, after completing a discovery process, playback device 350 determines relevant media items stored on other devices (e.g., media servers) available on home network 340. Thus, playback device 350 aggregates all media, relevant to playback device 350, for use at playback device 350 (i.e., playback, control. etc.). For example, if playback device 350 plays digital video, playback device 350 aggregates a list of all digital video available on home media network 340. The aggregated list includes all media items that may be converted to Format A. As described more fully below, playback device 350 may invoke a service on transcoder device 360 to determine media formats that may be converted to Format A. As shown in FIG. 4, playback device 350 aggregates all media items stored on media servers 310, 320 and 330.

Figure 5A:
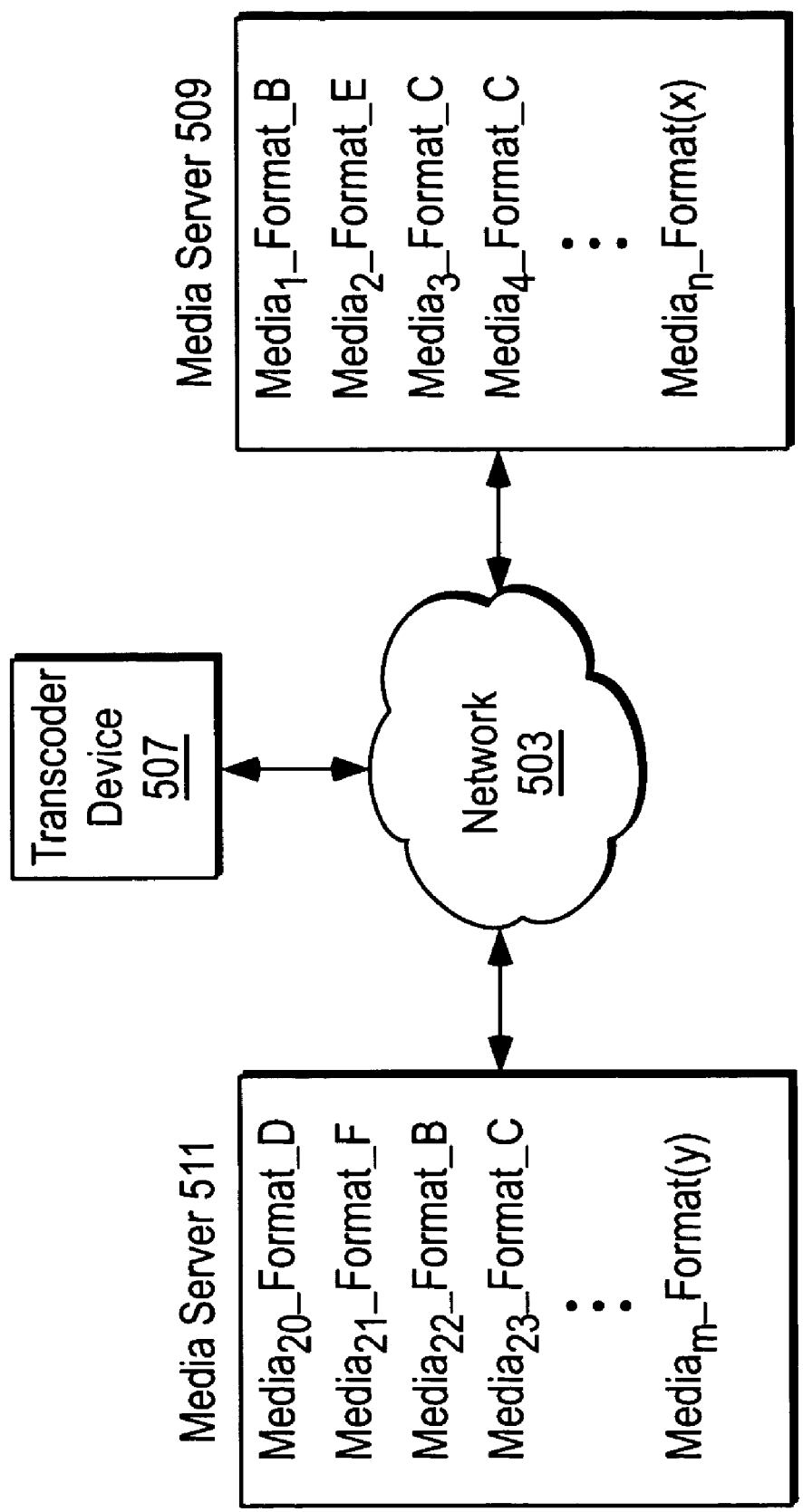
FIGS. 5a and 5b illustrate one embodiment for using a transcoder device with media servers.
Figure 5B:
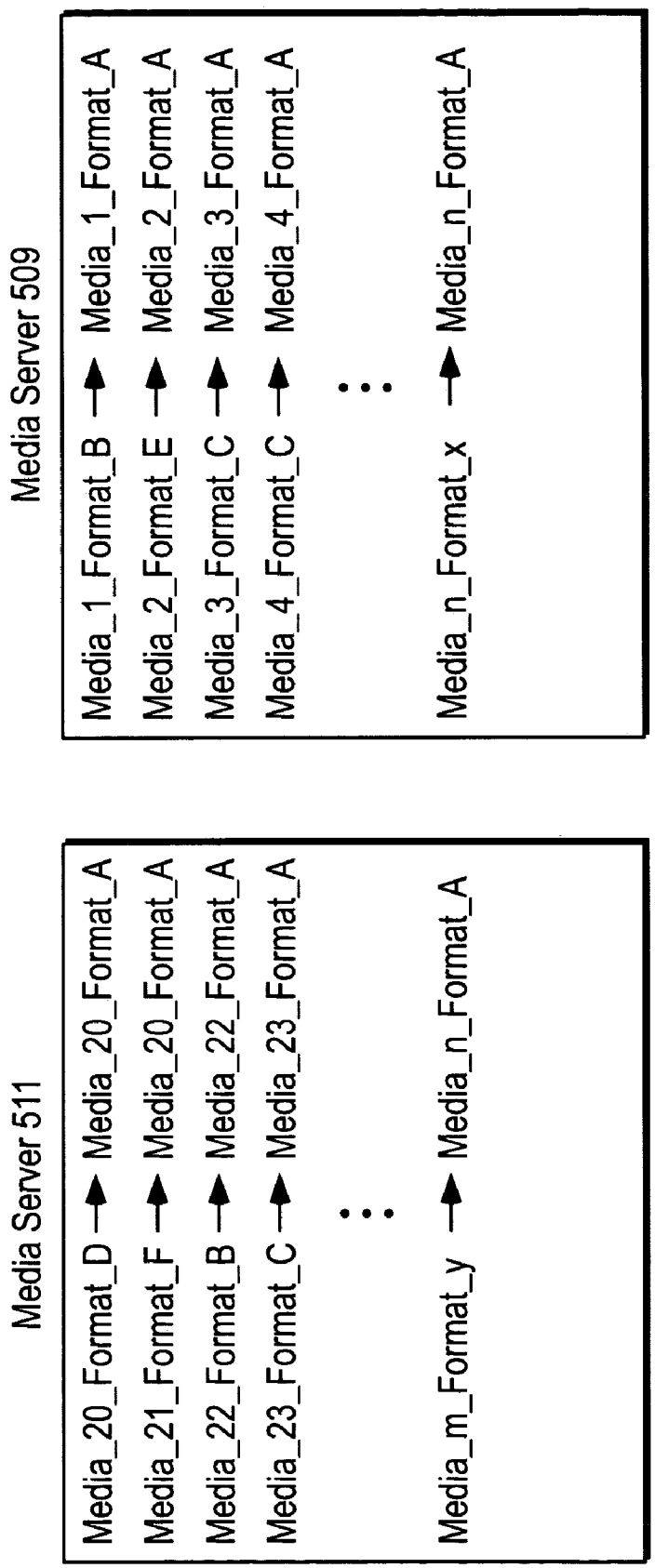

FIGS. 5a and 5b illustrate one embodiment for using a transcoder device with media servers. For the embodiment shown in FIG. 5a, media server 511 and media server 509 are coupled to transcoder device 507 through network 503. Each media server stores a number of media items, such as audio, video or photos. Each media item has an associated format (e.g., WMA, MP3, MPEG-2, MPEG-4, etc.). For the example shown in FIG. 5a, media server 509 stores media items Media_1_Format_B, Media_2_Format_E, Media_3_Format_C, Media_4_Format_C . . . Media_n_Format_X, wherein "n" is any integer value and X is any format type. Media server 511 stores, by way of example, Media_20_Format_D, Media_21_Format_F, Media_22_Format_B, Media_23_Format_C . . . Media_m_Format_y, wherein "m" is any integer value and y is any format type.

In one embodiment, an automated process is commenced to convert all media items stored on a media server to one or more formats. The process may run without initiation from a user and when system resources are available. Media items are transferred from a media server (509 or 511) to transcoder device 507. Transcoder 507 determines the current format of the media item, converts the media items to one or more different formats, and transfers the converted media items to the media server. The media server then stores the converted media items along with the media items in the original format. FIG. 5b illustrates an example for converting the media items of FIG. 5a to a specified format, "Format_A." As shown in FIG. 5b, after the conversion process, media server 511 stores, in addition to the original media, all media items converted to Format_A (i.e., Media_20_Format_A, Media_21_Format_A, Media_22_Format_A, Media_23_Format_A and Media_m_Format_A). Similarly, all media items stored in media server 509 are converted to Format_A (i.e., Media_1_Format_A, Media_2_Format_A, Media_3_Format_A, Media_4_Format_A and Media_n_Format_A).

In one embodiment a program allows the user to configure the parameters for the conversion process. For example, a user may specify one or more formats for conversion based on the media type of the original media item. For example, if the original media item is a WMA file, then the user may specify conversion to MP3. The user may also specify the frequency to conduct the conversion. For example, the user may specify that the system update media server items once everyday (i.e., traverse media server items and convert any media items not already converted to one or more specified formats). Also, the user may specify one or more media servers to perform the conversion process.

The underlying protocols of the media system do not permit a client device to aggregate media items from devices on the home network. The protocols themselves have no requirement to support a distributed system. For this embodiment of the media convergence platform, aggregation logic creates a distributed system using non-distributed protocols. The aggregation logic uses multiple protocols to integrate devices on the home network.

Figure 6:
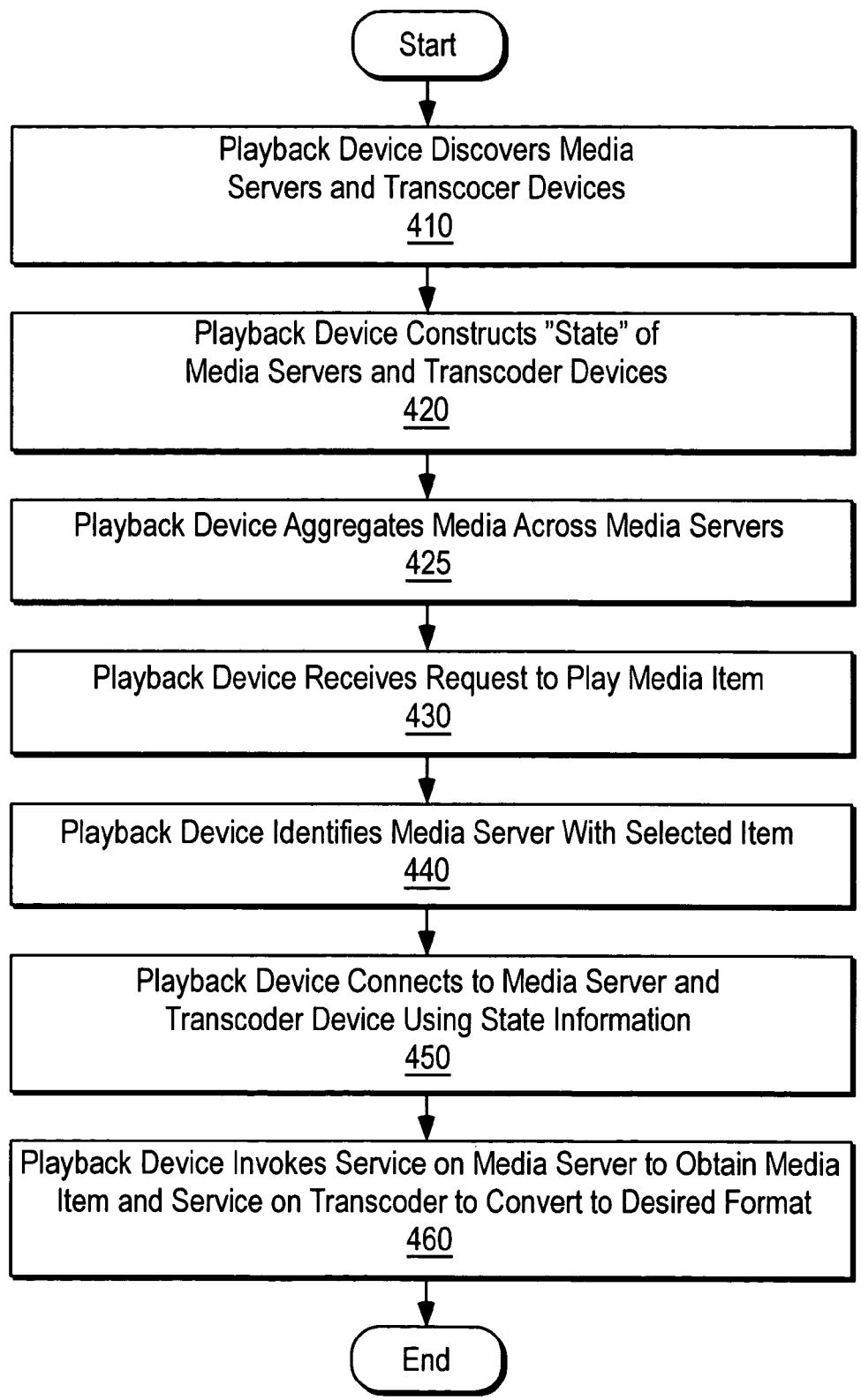
FIG. 6 is a flow diagram illustrating one embodiment for playback of media over a network.

FIG. 6 is a flow diagram illustrating one embodiment for playback of media over a network. Initially, a playback device discovers media servers and transcoder devices on the home network (block 410, FIG. 6). One embodiment for discovering devices on the home network is described more fully below. Based on information learned in the discovery process, the playback device constructs state information for the discovered media servers and transcoder devices (block 420, FIG. 6). The playback device aggregates a list of media items available through the network (block 425, FIG. 6). The aggregation logic for the playback device acquires media items from all media servers that contain compatible media items. For example, if the playback device plays music items, the playback device acquires all music items from all media servers available on the network.

The playback device receives a request to play media item(s) (block 430, FIG. 6). In response, the playback device connects to a selected media server and transcoder device using state information acquired during the discovery process (block 450, FIG. 6). Specifically, the playback device translates the request to play a media item to a protocol supported by the media server with the selected item, and forwards the request to the media server. Similarly, the playback device translates the request to transcode a media item to a protocol supported by the transcoder, and forwards the request to the transcoder. In one embodiment, the playback device invokes a service on the selected media server to obtain the media items and invokes a service on the transcoder to convert the file format. (block 460, FIG. 6). In one embodiment, the playback device invokes a content manager service on the media server to acquire the media item.

Figure 7:
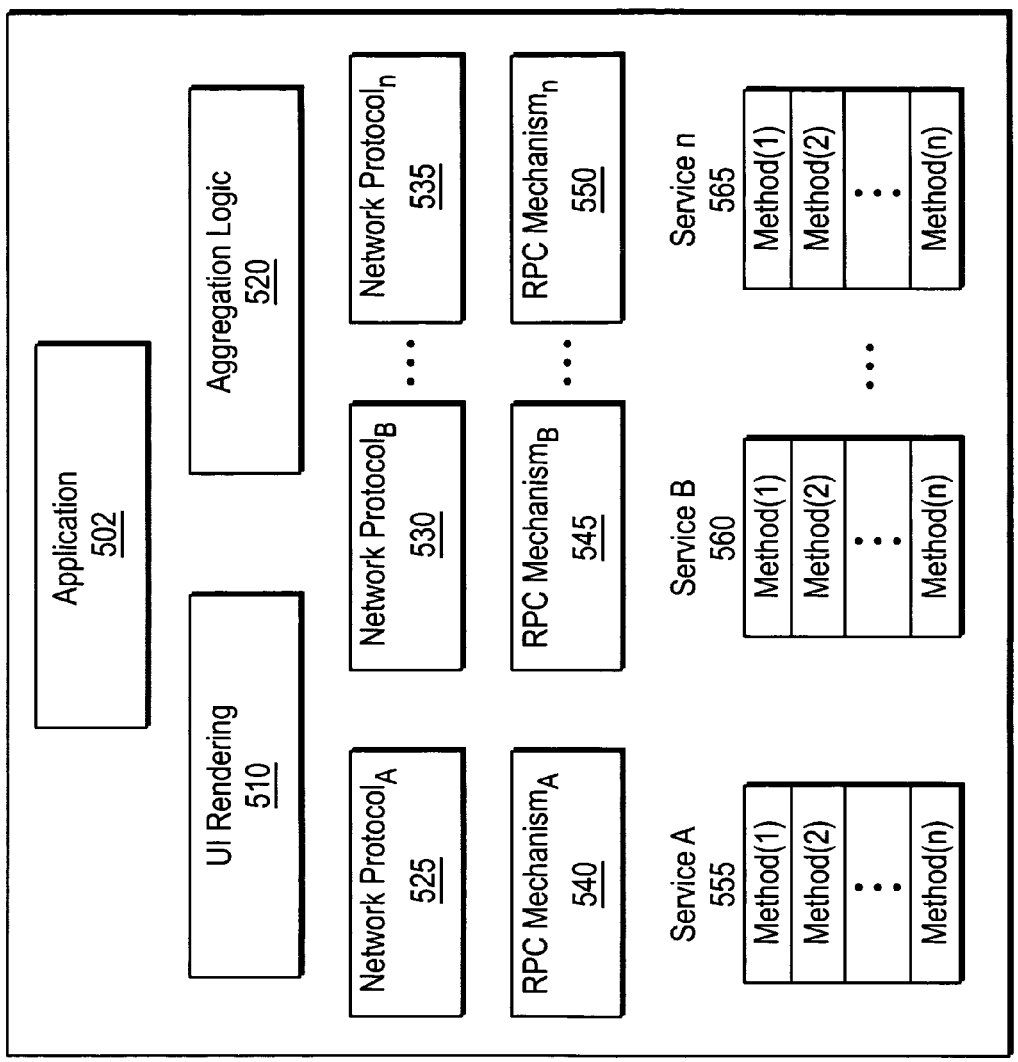
FIG. 7 is a block diagram illustrating one embodiment for software components operating on a media convergence platform device.

FIG. 7 is a block diagram illustrating one embodiment for software components operating on a media convergence platform device. Software components 500 include, at the highest level, application software 502. The application software 502 implements functionality for an underlying device. For example, application software 502 may implement functions for a DVD player. As shown in FIG. 7, underneath the application software 502 is aggregation logic 520. Aggregation logic 520 permits a client device to aggregate media items on the home network.

The software components 500 also include user interface ("UI") rendering logic 510. UI rendering component 510 translates scene information to display information suitable for display on the client device. The UI rendering component 510 also renders the display data. For example, if the underlying client device includes a television display (e.g., CRT), then UI rendering engine 510 generates graphics data from scene information, and renders the graphics data on the television display. If the display on the client device is a LCD display, then UI rendering engine 510 generates lists from scene information, and displays the lists on the LCD display.

As shown in FIG. 7, the client device incorporates one or more network protocols and remote procedure calls ("RPC") mechanisms. For example, FIG. 7 shows that the client device supports network protocol$_A$ (525), network protocol$_B$ (530), and network protocols$_n$ (535). For this example, client device software 500 supports RPC mechanism$_A$ (540), RPC mechanism$_B$ (545), and RPC mechanisms$_n$ (550).

The client device software 500 supports one or more services. As shown in FIG. 7, one or more methods of a service are accessible through an interface. In general, the methods, when invoked, provide specific functionality for the underlying service. For this example, client device software 500 includes service$_A$ (555), service$_B$ (560), and services (565). Each service is associated with one or more methods (i.e., method(1)—method(n)).

In one embodiment, the media convergence platform supports a plurality of underlying protocols. In general, the protocols define commands, RPC mechanisms, and interfaces to services. In one embodiment, the media convergence platform supports an industry defined UPnP protocol. In general, the UPnP protocol defines discovery over IP networks, an RPC mechanism, and interfaces for activating services. UPnP services include: a content directory service, a connection manager service, an audio/video ("A/V") transport service and an A/V control service.

In one embodiment, the media convergence platform also supports a proprietary protocol (i.e., non-industry standard protocol). For this embodiment, the proprietary protocol defines a network discovery process, an RPC mechanism, and an interface to services. The services include a content manager and a media player service. The content manager service allows a client device to interface to a database. Specifically, using the content manager service, the client device may extract information (e.g., URL to identify media, metadata, etc.) from a database on another network device. Thus, the content manager service provides a means for a device of the media convergence platform system to query a database. The media player service defines an interface to permit playback functionality (e.g., initiate and control media streams).

In one embodiment, the discovery process on the proprietary protocol implements asynchronous based messaging. The discovery protocol operates on any network that supports packet based messaging or on a serialized network. In one embodiment, the discovery protocol includes an "announce" command, a "discovery" command, and a "bye-bye" command. The announce command is used by a device to announce its presence on the home media network. A discovery command is a request for an announcement (i.e., queries whether any client devices are on the home network). The "bye-bye" command is used by a client device to announce that the client device is leaving the network. In one embodiment, there are two types of announcements and two types of "bye-bye" commands: one for devices and one for services.

In one embodiment, the RPC mechanism, supported by the proprietary protocol, uses a packet based protocol. The services include methods and an identification number to permit a device on the home network to construct RPC based packets with the appropriate arguments. In general, an RPC mechanism permits a device to control another device on the network. The protocol is effectuated through requests and responses. The RPC packets include a header. In one embodiment, the header contains: version information, a command class (maps to a particular service), the command (the method the device is requesting or the response coming from the method), an identification (identification of requests or identification of responses corresponding to a request), and a length. After the header, the RPC protocol format specifies data (i.e., arguments for requests and returns values for responses).

Figure 8:
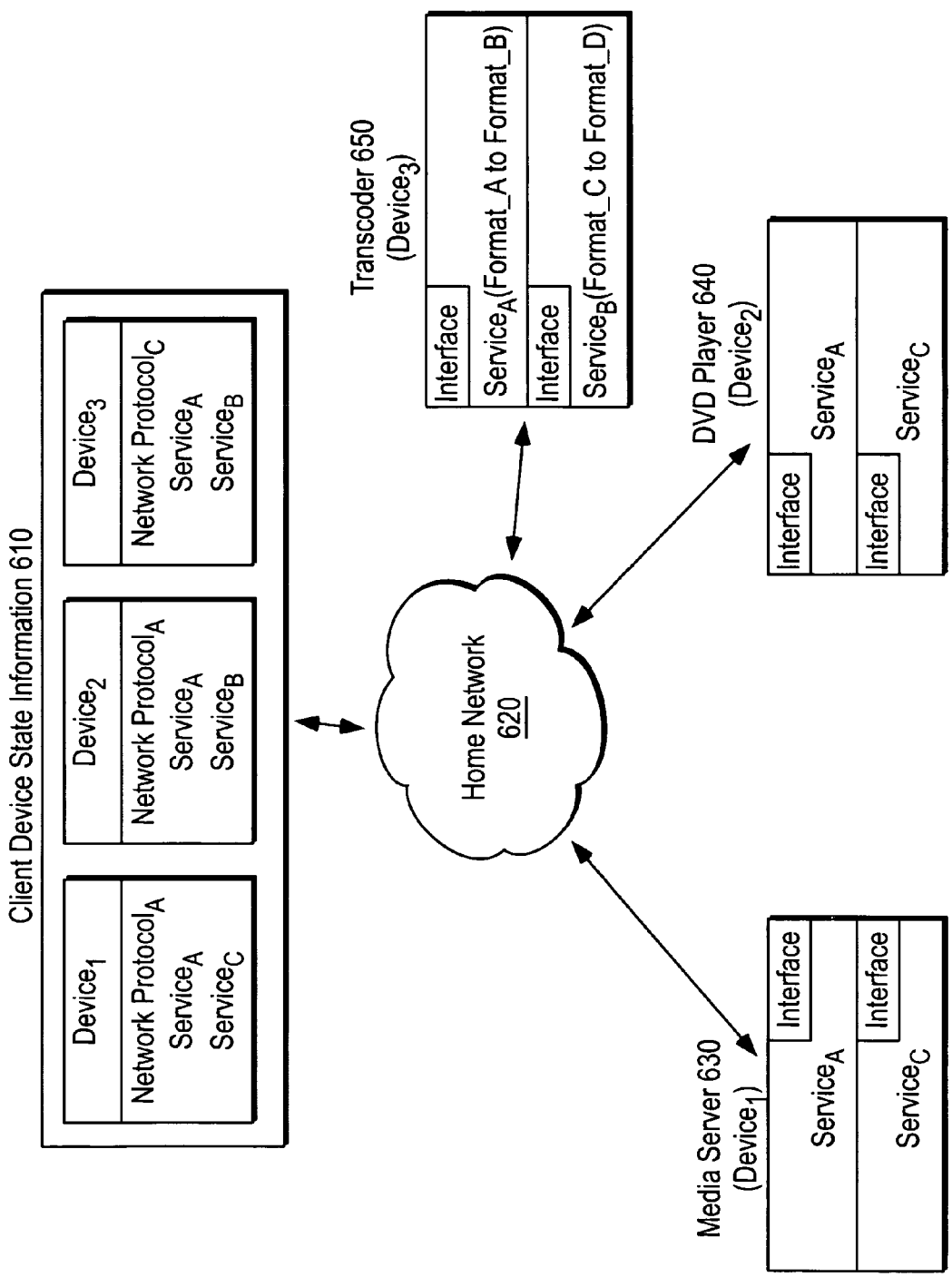
FIG. 8 is a block diagram illustrating an example home network for the media convergence platform.

FIG. 8 is a block diagram illustrating an example home network for the media convergence platform. For this example, a home network includes transcoder 650, DVD player 640, and media server 630. A client device (610) enters the home network 620, and discovers, using a supporting protocol, three devices (e.g., transcoder 650, DVD player 640, and media server 630). As shown in FIG. 8, client device 610 stores state information for each of the devices discovered on home network 620. Specifically, client device 610 stores, for device$_1$ (media server 630) a supporting network protocol (i.e., network protocol$_A$) as well as a list of services supported by the devices (i.e., service$_A$ and service$_C$). The network protocol also specifies an RPC mechanism to execute remote procedure calls on media server 630. Similarly, state information for device$_2$ (i.e., DVD player 640) indicates that device$_2$ supports network protocol$_A$ and implements service$_A$ and service$_B$. Device$_3$, transcoder 650, supports network protocol$_C$, and implements service$_A$ and service$_B$. For this example, service$_A$ supports the conversion between Format$_A$ to Format$_B$, and service$_B$ supports the conversion from Format$_C$ to Format$_D$.

As shown in FIG. 8, each service (e.g., service$_A$, service$_B$, and service$_C$) supports an interface. The interface defines a specification to provide a means to access the methods or commands within a service. As such, the client device 610 utilizes services (service$_A$ or service$_B$) on transcoder 650 through their respective interfaces. Note that media server 630, DVD player 640 and transcoder 650 all implement service$_A$. Each interface for service$_A$ is the same to permit uniform accessibility to the service. However, the implementation of service$_A$ in each of the devices may be different.

In one embodiment, a media convergence platform implementation provides security. For this embodiment, the announcement command is open ended, such that the protocol only defines a minimum specification for communication. Thus, announcement protocols may support multiple network specifications, including TCP and secure sockets layer ("SSL"). The protocol supports implementation on TCP/IP networks. In addition, the protocol supports SSL operating on TCP/IP networks. SSL permits secure communications, including authentication, between two parties on a network.

The proprietary protocol also permits an implementation using partial security. For this embodiment, a service may include some methods that require secure communications and other methods that do not require secure communications. Thus, some methods utilize SSL technology to realize secure communications between two devices on the home network.

Figure 9:
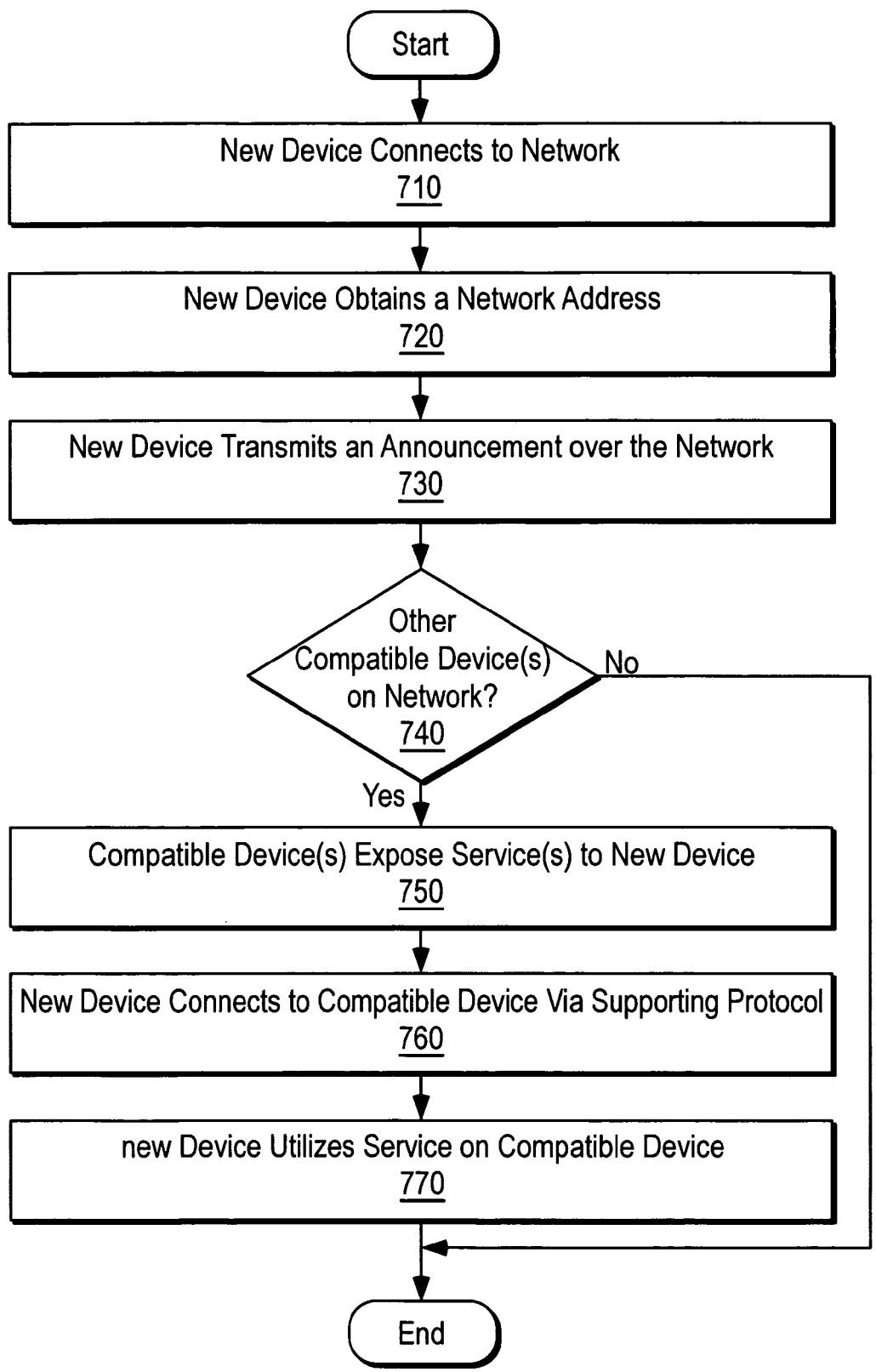
FIG. 9 is a flow diagram illustrating one embodiment for discovering devices in the media convergence system.

FIG. 9 is a flow diagram illustrating one embodiment for discovering devices in the media convergence system. A new device (i.e., a device not currently connected to the network) is connected to the home media network (710, FIG. 9). In order to communicate on the network, the new device obtains a network address (block 720, FIG. 9). For example, in an IP network, the client requires an IP address. If the underlying network supports TCP/IP, then the client device determines if there is a DHP server. If so, the DHP server assigns the IP address to the new device. If no DHP server is available to assign the new device an IP address, then the new device selects an IP address from a pool and determines whether any other device on the home network has that IP address. If no other device on the network has that IP address, then the client device uses this IP address. This process of auto IP addressing allows communication on a home network within a single subnet.

The new device transmits an "announcement" command over the network (block 730, FIG. 9). The format of the announcement command complies with a protocol supported by the devices. The new device may broadcast or multicast the announcement command over the network. For example, in an IP network, the new device may multicast the announcement in order to expand subnets if the home network includes a gateway. A multicast format is used to specify specific IP addresses (e.g., transmitting an announcement only to those devices on the network interested or compatible with the new device). As used herein, compatible devices are those devices that may be interested in communicating with the client device.

In response to the new device's announcement command, the new device constructs state information. In general, the state information provides details regarding devices available on the network. The state information includes protocols and services supported by those devices. When compatible devices on the network receive the announcement command, those compatible devices may add information, encapsulated in the announcement command, to a local cache.

If there are no compatible devices on the network or the new device does not desire to utilize a service on the network, then the process terminates. For example, if the new device is an MP3 player, then compatible devices include those media servers storing MP3 audio as well as other MP3 players. If there are other compatible devices on the network, those devices expose one or more services to the new device (block 750, FIG. 9). To discovery services on the network, the new device transmits a discovery command and waits for a response. For this example, a media server, which stores MP3 audio, exposes an interface to allow the new device to aggregate the MP3 audio stored on that media server. Similarly, a compatible MP3 player exposes a service, through a predefined interface, to permit the new device to play MP3 audio stored on the new device at the compatible MP3 player.

In response to the request (e.g., new device application logic), the new device connects to a compatible device via a supporting protocol (block 760, FIG. 9). Specifically, the device translates the protocol for the appropriate device using the state information. For example, if the compatible device supports an industry standard protocol, then the new device selects the industry standard protocol to communicate to that device. The new device utilizes the services on the compatible device (block 770, FIG. 9).

A media server entering a home network is one example of the discovery process. For this example, the media server, after obtaining a network address, transmits an announcement command over the network. The media server announces the services it supports (e.g., content manager, media player service), and exposes interfaces to network clients to permit access to those services. If a device enters the network, the device waits for an announcement from the server. When the client identifies the media server, the client connects to the media server via a protocol the server specified in the announcement command. This process allows the client device to navigate media on the media server. Using the supporting protocol, the client device connects to a playback device, either itself or another playback device, and instructs the playback device to play the item that a user selected from those media items available on the media server.

Although the present invention has been described in terms of specific exemplary embodiments, it will be appreciated that various modifications and alterations might be made by those skilled in the art without departing from the spirit and scope of the invention.

What is claimed is:

1. A method for managing media in a networked media system comprising a source device, at least one playback device, and a transcoder device, the method comprising:
   receiving, at the playback device, source-device state information from the source device, the source-device state information specifying a first network protocol and a content service supported by the source device configured to store digital media files in a plurality of formats, the content service configured to provide other network devices access to digital media files stored on the source device, the playback device configured to playback digital media files in a first of the plurality of formats;
   receiving, at the playback device, transcoder-device state information from the transcoder device, the transcoder-device state information specifying a second network protocol and a conversion service supported by the transcoder device, the conversion service for conversion of digital media files, the first and second network protocols being different network protocols;

determining whether the conversion service of the transcoder device converts digital media files in at least one of the plurality of formats to the first format;

in response to a determination that the conversion service of the transcoder device converts digital media files in at least one of the plurality of formats to the first format, aggregating, at the playback device, a list of digital media files stored on the source device, wherein the aggregated list includes only digital media files that can be provided to the playback device in the first format;

sending, from the playback device to the source device, a first request invoking the content service on the source device for accessing a first digital media file included in the list of digital media files, the first digital media file being stored on the source device, the first request being translated to the first network protocol by the playback device;

sending, from the playback device to the transcoder device, a second request invoking the conversion service on the transcoder device for converting the first digital media file to the first format, the second request being translated to the second network protocol by the playback device; and playing back, at the playback device, the first digital media file converted to the first format, wherein the source device, the playback device, and the transcoder device comprise separate network devices coupled through a network.

2. The method of claim 1, further comprising:

sending the source-device state information through the network from the source device to the playback device, the source-device state information further specifying a plurality of services supported by the source device;

exposing, at the source device, each service specified in the source-device state information to the other network devices; and requesting, at the playback device, an exposed service of the source device using the first network protocol specified in the source-device state information.

3. The method of claim 1, further comprising:

sending the transcoder-device state information through the network from the transcoder device to the playback device, the transcoder-device state information further specifying a plurality of services supported by the transcoder device;

exposing, at the transcoder device, each service specified in the transcoder-device state information to the other network devices; and requesting, at the playback device, an exposed service of the transcoder device using the second network protocol specified in the transcoder-device state information.

4. The method of claim 1, further comprising:

upon the playback device being coupled to the network, sending playback-device state information from the playback device to the source device and the transcoder device through the network, the playback-device state information specifying at least one network protocol and at least one service supported by the playback device;

exposing, at the playback device, each service specified in the playback-device state information to the other network devices; and requesting an exposed service of the playback device using a network protocol specified in the playback-device state information.

5. The method of claim 1, wherein:

the networked media system utilizes a peer-to-peer architecture so that network devices directly communicate with each other through the network using network protocols specified in the state information for each network device; and requests sent to a network device is translated to the network protocol specified in the state information for the network device.

6. The method of claim 1, wherein the transcoder-device state information further specifies a plurality of conversion services supported by the transcoder device, each conversion service for converting different formats of digital media files, the method further comprising:

determining, using the transcoder-device state information, which of the plurality of formats of digital media files stored at the source device comprise formats that are convertible to the first format, wherein aggregating the list of digital media files comprises aggregating a list of digital media files stored on the source device that are convertible to the first format.

7. The method of claim 1, wherein:

the digital media files comprise audio media files, video media files, or image media files stored on the source device;

the playback device is configured to playback audio media files; and aggregating the list of digital media files comprises aggregating a list of only audio media files stored on the source device.

8. The method of claim 7, wherein:

an audio media file in the first format comprises a Microsoft Windows Median audio ("WMA") file, a Moving Pictures Experts Group layer 3 ("MP3"), or a Real Audio file; and an audio media file in the second format comprises a pulse code modulated ("PCM") file or a Moving Pictures Experts Group layer 3 ("MP3") file.

9. The method of claim 1, wherein:

the digital media files comprise audio media files, video media files, or image media files stored on the source device;

the playback device is configured to playback video media files; and aggregating the list of digital media files comprises aggregating a list of only video media files stored on the source device.

10. The method of claim 9, wherein:

a video media file in the first format comprises a Moving Pictures Experts Group layer 4 ("MPEG-4") file, a Moving Joint Photographic Experts Group ("MJPEG") file, a Quicktime file, a Microsoft Windows Media Video ("WMV") file, or a Real Video file; and a video media file in the second format comprises a Moving Pictures Experts Group layer 2 ("MPEG-2") file.

11. The method of claim 1, wherein:

the digital media files comprise audio media files, video media files, or image media files stored on the source device;

the playback device is configured to playback image media files; and aggregating the list of digital media files comprises aggregating a list of only image media files stored on the source device.

12. The method of claim 1, further comprising:

after sending the first request to the source device, transmitting through the network the first digital media file from the source device to the transcoder device; and after sending the second request to the transcoder device, transmitting through the network the first digital media file in the first format from the transcoder device to the playback device for playback.

13. The method of claim 1, wherein the networked media system further comprises a plurality of source devices configured to store digital media files in the plurality of formats and aggregating the list of digital media files comprises aggregating a list of digital media files stored on the plurality of source devices, the method further comprising:
determining which of the plurality of source devices stores the first digital media file.

14. The method of claim 1, wherein the content service supported by the source device further allows other network devices to extract information to identify digital media files on the source device.

15. The method of claim 1, further comprising:
prior to sending the first request to the source device, receiving, at the playback device, a user request to play the first digital media file.

16. The method of claim 1, further comprising:
transmitting through the network the first digital media file in the first format from the transcoder device to the source device for storage.

17. A networked media system for managing media, the networked media system comprising:
a source device configured for storing digital media files in a plurality of formats;
a transcoder device configured for converting digital media files;
a playback device configured for:
playing back digital media files in a first of the plurality of formats;
receiving, from the source device, source-device state information specifying a first network protocol and a content service supported by the source device, the content service for providing other network devices access to digital media files stored on the source device;
receiving, from the transcoder device, transcoder-device state information specifying a second network protocol and a conversion service supported by the transcoder device, the conversion service for converting digital media files, the first and second network protocols being different network protocols;
determining whether the conversion service of the transcoder device converts digital media files in at least one of the plurality of formats to the first format;
in response to a determination that the conversion service of the transcoder device converts digital media files in at least one of the plurality of formats to the first format, aggregating a list of digital media files stored on the source device, wherein the aggregated list includes only digital media files that can be provided to the playback device in the first format;
sending, to the source device, a first request invoking the content service on the source device for accessing a first digital media file included in the list of digital media files, the first digital media file being stored on the source device, the first request being translated to the first network protocol;
sending, to the transcoder device, a second request invoking the conversion service on the transcoder device for converting the first digital media file to the first format, the second request being translated to the second network protocol; and
playing back at the playback device, the first digital media file converted to the first format; and a network coupling the source device, transcoder device, and playback device which comprise separate network devices.

18. The networked media system of claim 17, wherein: the source device is further configured for:
sending the source-device state information through the network to the playback device, the source-device state information further specifying a plurality of services supported by the source device; and
exposing each service specified by the source-device state information to the other network devices; and
the playback device is further configured for:
requesting an exposed service of the source device using the first network protocol specified in the source-device state information.

19. The networked media system of claim 17, wherein:
the transcoder device is further configured for:
sending the transcoder-device state information through the network to the playback device, the transcoder-device state information further specifying a plurality of services supported by the transcoder device; and
exposing each service specified in the transcoder-device state information to the other network devices; and
the playback device is further configured for:
requesting an exposed service of the transcoder device using the second network protocol specified in the transcoder-device state information.

20. The networked media system of claim 17, wherein:
the playback device is further configured for:
upon being coupled to the network, sending playback-device state information to the source device and the transcoder device through the network, the playback-device state information specifying at least one network protocol and at least one service supported by the playback device; and
exposing, at the playback device, each service specified in the playback-device state information to the other network devices; and
the source device and transcoder device are further configured for:
requesting an exposed service of the playback device using a network protocol specified in the playback-device state information.

21. The networked media system of claim 17, wherein:
the networked media system utilizes a peer-to-peer architecture so that network devices directly communicate with each other through the network using network protocols specified in the state information for each network device; and
requests sent to a network device is translated to the network protocol specified in the state information for the network device.

22. The networked media system of claim 17, wherein:
the transcoder-device state information further specifies a plurality of conversion services supported by the transcoder device, each conversion service for converting different formats of digital media files; and
the playback device is further configured for determining, using the transcoder-device state information, which of the plurality of formats of digital media files stored at the source device comprise formats that are convertible to the first format, wherein aggregating the list of digital media files comprises aggregating a list of digital media files stored on the source device that are convertible to the first format.

23. The networked media system of claim 17, wherein:
the digital media files comprise audio media files, video media files, or image media files stored on the source device;
the playback device is configured for playback of audio media files; and
aggregating the list of digital media files comprises aggregating a list of only audio media files stored on the source device.

24. The networked media system of claim 23, wherein:
an audio media file in the first format comprises a Microsoft Windows Media Audio ("WMA") file, a Moving Pictures Experts Group layer 3 ("MP3"), or a Real Audio file; and
an audio media file in the second format comprises a pulse code modulated ("PCM") file or a Moving Pictures Experts Group layer 3 ("MP3") file.

25. The networked media system of claim 17, wherein:
the digital media files comprise audio media files, video media files, or image media files stored on the source device;
the playback device is configured for playback of video media files; and
aggregating the list of digital media files comprises aggregating a list of only video media files stored on the source device.

26. The networked media system of claim 25, wherein:
a video media file in the first format comprises a Moving Pictures Experts Group layer 4 ("MPEG-4") file, a Moving Joint Photographic Experts Group ("MJPEG") file, a Quicktime file, a Microsoft Windows Media Video ("WMV") file, or a Real Video file; and
a video media file in the second format comprises a Moving Pictures Experts Group layer 2 ("MPEG-2") file.

27. The networked media system of claim 17, wherein:
the digital media files comprise audio media files, video media files, or image media files stored on the source device;
the playback device is configured for playback of image media files; and
aggregating the list of digital media files comprises aggregating a list of only image media files stored on the source device.

28. The networked media system of claim 17, wherein:
the source device is further configured for transmitting through the network the first digital media file to the transcoder device; and
the transcoder device is further configured for transmitting through the network the first digital media file in the first format to the playback device for playback.

29. The networked media system of claim 17, further comprising:
a plurality of source devices configured for storing digital media files, wherein aggregating the list of digital media files comprises aggregating a list of digital media files stored on the plurality of source devices, and the playback device is further configured for determining which of the plurality of source devices stores the first digital media file.

30. The networked media system of claim 17, wherein the content service supported by the source device further allows other network devices to extract information to identify digital media files on the source device.

31. The networked media system of claim 17, wherein the playback device is further configured for receiving a user request to play the first digital media file.

32. The networked media system of claim 17 wherein the transcoder device is further configured for transmitting through the network the first digital media file in the first format to the source device for storage.

33. A method for managing media in a networked media system comprising a source device, at least one playback device, and a transcoder device, the method comprising:
receiving, at the playback device, source-device state information from the source device, the source-device state information specifying a first network protocol and a content service supported by the source device configured to store digital media files in a plurality of formats, the content service configured to provide other network devices access to digital media files stored on the source device, the playback device configured to playback digital media files in a first of the plurality of formats;
receiving, at the playback device, transcoder-device state information from the transcoder device, the transcoder-device state information specifying a second network protocol and a conversion service supported by the transcoder device, the conversion service for conversion of digital media files, the first and second network protocols being different network protocols;
determining whether the conversion service of the transcoder device converts digital media files in at least one of the plurality of formats to the first format;
in response to a determination that the conversion service of the transcoder device converts digital media files in at least one of the plurality of formats to the first format, aggregating, at the playback device, a list of the digital media files stored on the source device, wherein the aggregated list includes only digital media files that can be provided to the playback device in the first format;
playing back, at the playback device, one of the digital media files converted by the transcoder to the first format.

* * * * *